(12) United States Patent
Siddiqui et al.

(10) Patent No.: US 10,844,201 B2
(45) Date of Patent: Nov. 24, 2020

(54) THERMALLY STABLE HIGH DENSITY POLYETHYLENE-ASPHALTENE COMPOSITE

(71) Applicant: KING FAHD UNIVERSITY OF PETROLEUM AND MINERALS, Dhahran (SA)

(72) Inventors: Mohammad Nahid Siddiqui, Dhahran (SA); Halim Hamid Redhwi, Dhahran (SA); Muhammad Younas, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 16/193,515

(22) Filed: Nov. 16, 2018

(65) Prior Publication Data

US 2020/0157323 A1   May 21, 2020

(51) Int. Cl.
*C08L 23/06* (2006.01)
*C08J 3/20* (2006.01)

(52) U.S. Cl.
CPC ............... *C08L 23/06* (2013.01); *C08J 3/201* (2013.01); *C08L 2207/062* (2013.01)

(58) Field of Classification Search
CPC ............................ C08L 23/06; C08L 2207/062
See application file for complete search history.

(56) References Cited

U.S. PATENT DOCUMENTS

| 4,868,233 | A | 9/1989 | Moran |
| 8,609,752 | B2 | 12/2013 | Bowen, III |
| 2006/0148939 | A1 | 7/2006 | Pinto |
| 2017/0058460 | A1 | 3/2017 | Abramson et al. |
| 2017/0133832 | A1* | 5/2017 | Hellige ................. H01R 4/726 |
| 2017/0369687 | A1 | 12/2017 | Siddiqui |

FOREIGN PATENT DOCUMENTS

CN   103160134 A   6/2013

OTHER PUBLICATIONS

M. Siddiqui, "Asphaltene Used for Enhancing Polymer Properties" Prepr. Pap.-Am. Chem. Soc., Div., 2015, vol. 60, Issue 2, pp. 597-599.

* cited by examiner

*Primary Examiner* — Wenwen Cai
(74) *Attorney, Agent, or Firm* — Oblon, McClelland, Maier & Neustadt, L.L.P.

(57) ABSTRACT

A high density polyethylene-asphaltene composite that includes 85 to 98 wt. % of a high density polyethylene (HDPE) polymer and 10 wt. % or less of a filler, wherein the filler is an asphaltene, the asphaltene is the only filler present, and the asphaltene is uniformly dispersed within a matrix of the HDPE polymer. The thermal stability of the high density polyethylene-asphaltene composite is improved compared to the high density polyethylene polymer.

20 Claims, 11 Drawing Sheets

THERMALLY STABLE HIGH DENSITY POLYETHYLENE-ASPHALTENE COMPOSITE

STATEMENT OF ACKNOWLEDGEMENT

The inventors acknowledge the support provided by the Deanship of Scientific Research (DSR) at King Fand University of Petroleum & Minerals (KFUPM), Dhahran, Saudi Arabia, for proposed funding of this work through project number IN151028.

BACKGROUND OF THE INVENTION

Technical Field

The present invention relates to composite materials made from high density polyethylene (HDPE) polymers and asphaltenes.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

High density polyethylene (HDPE) is a semi crystalline polymer typically obtained by the coordination polymerization of ethylene using a Ziegler-Natta or metallocene catalyst. Its polymeric chains are mostly linear with short chain branches. HDPE is an important commodity thermoplastic, widely used in various applications due to its good mechanical properties, strong tenacity, easy processability, recyclability, good chemical resistance, biocompatibility, low toxicity, and relatively low cost.

Properties of HDPE can be further improved by the incorporation of various inorganic or organic nanofillers into the HDPE matrix [Ahmad A A, Al-Juhani A A, Thomas S, De S K, Atieh M A (2013) Effect of modified and nonmodified carbon nanotubes on the rheological behavior of high density polyethylene nanocomposite. J Nanomater 2013: 12—incorporated herein by reference in its entirety]. HDPE based nanocomposites with various nanoparticles, like carbon nanotubes (CNTs), nanoclays such as montmorillonite (MMT) and metal oxide nanoparticies have been reported previously [Osman M A, Atallah A (2006) Effect of the particle size on the viscoelastic properties of filled polyethylene. Polymer 47(7): 2357-2368; Tang Y, Yang C, Gao P Ye L, Zhao C. Lin W (2011) Rheological study on high-density polyethylene/organoclay composites. Polym Eng Sci 51(1): 133-142, Vega J F, Martinez-Salazar J, Trujillo M, Arnal M L, Müller A J, Bredeau S Dubois P (2009) Rheology, processing, tensile properties, and crystallization of polyethylene/carbon nanotube nanocomposites. Macromolecules 42(13):4719-4727; Sepet, H., Tarakcioglu, N., Misra, R D K. J. Compos. Mater. 50(22), 3105-3116 (2016); Kord, B., Ravanfar, P., Ayrilmis, N. J. Polym. Environ. Published online 23 Nov. 2016. DOI 10.1007/s10924-016-0897-x; Fambri, L., Dabrowska, Ferrara, G., Pegoretti, A. Polym. Compos. 37, 288-298 (2016)—each incorporated herein by reference in its entirety]. Nanocomposites with enhanced flame retardancy have been obtained when an organomodified nanoclay was added to bagasse reinforced HDPE [Kord, B., Ravanfar, P., Ayrilmis, N. J. Polym. Environ. Published online 23 Nov. 2016. DOI 10.1007/s10924-016-0897-x incorporated herein by reference in its entirety]. Advanced viscoelastic properties have been observed by adding 1 wt. % of hydrotalcite to HDPE melt-spun fibers [Fambri, L., Dabrowska, Ferrara, G., Pegoretti, A. Polym. Compos. 37, 288-298 (2016)—incorporated herein by reference in its entirety]. The formation of HDPE composites strengthened-toughened synergistically by L-aspartic acid functionalized graphene/carbon nanotubes hybrid materials have been studied by Bian et al. [Bian, J., Wang, G Lin, H. L., Zhou, X., Wang, Z. J., Xiao, W. Q., Zhao, X. W. J. Appl. Polym. Sci. 134, 45055, 2017—incorporated herein by reference in its entirety]. Furthermore, the addition of silver nanoparticles on the HDPE/clay nanocomposites was studied by Roy et al. [Roy, A., Joshi, M., Butola, B. S., Srivastava, A. K. Silver-loaded HDPE/clay nanocomposites with antibacterial property. Polym. Compos. 2017, 39: E366-E377—incorporated herein by reference in its entirety] and emphasis was put on their antibacterial properties. Nanoparticles of silicalite-1 were used with HDPE and their rheological and physical properties were investigated by Chae et al. [Chae, D. W Kim, K. J., & Kim, B. C. (2006). Effects of silicate-1 nanoparticles on rheological and physical properties of HDPE. Polymer, 47(10), 3609-3615—incorporated herein by reference in its entirety]. It was found that ultrasonic treatment enhanced the intercalation of HDPE into lattice layers of clay by increasing d-spacing up to 50% [Swain, S. K., & Isayev, A. I. (2007). Effect of ultrasound on HDPE/clay nanocomposites: Rheology, structure and properties. Polymer, 48(1), 281-289—incorporated herein by reference in its entirety]. Polymer nanocomposites from HDPE/exfoliated graphite were equivalent in flexural stiffness and strength to HDPE composites reinforced with glass fibers and carbon black [Jiang, X., & Drzal, L. T. (2010). Multifunctional high density polyethylene nanocomposites produced by incorporation of exfoliated graphite nanoplatelets 1: morphology and mechanical properties. Polymer Composites, 31(6), 1091-1098—incorporated herein by reference in its entirety]. Composites made from nanoparticles of nano-$CaCO_3$ and OMMT in HDPE have also been reported [Dai, X., Shang, Q., Jia, Q., Li, S., & Xiu, Y. (2010). Preparation and properties of HDPE/$CaCO_3$/OMMT ternary nanocomposite. Polymer Enginnering and Science, 50(5), 894-899; Lee, Y. H., Park, C., Sain, M., Kontopoulou, M., & Zheng, W. (2007). Effects of clay dispersion and content on the rheological, mechanical properties, and flame retardance of HDPE/clay nanocomposites. J. Appl. Polym. Sci., 105(4), 1993-1999—each incorporated herein by reference in its entirety].

Morphology and rheological behavior under extensional and shear flow of HDPE/halloysite nanocomposites was investigated by Singh et al. [Singh, V. P., Vimal, K. K. Kapur, G. S., Sharma, S., Choudhary, V. High-density polyethylene/halloysite nanocomposites: morphology and rheological behaviour under extensional and shear flow. J. Polym. Res. 23: 43, 1-17 (2016)—incorporated herein by reference in its entirety]. The influence of the intercalation of octadecylamine inside zirconium phosphate modified with long-chain amine galleries on the HDPE characteristics was further investigated by Lino et al. [Lino, A. S., Mendes, L. C., da Silva, D.de F., Maim, O. High density polyethylene and zirconium phosphate nanocomposites. Polímeros, 25(5), 477-482, 2015—incorporated herein by reference in its entirety]. Finally, HDPE composites reinforced with multi-walled carbon nanotubes (MWCNTs) and nano-silicon dioxide ($SiO_2$) fillers were evaluated for flame retardancy and thennal properties for cable and wire applications [T. A.

Praveen, J. Sundara Rajan, and R. R. N. Sailaja Evaluation of thermal and flame properties of HDPE-MWCNT-SiO$_2$ nanocomposites. Compos. Interf 24(2), 2017—incorporated herein by reference in its entirety].

However, there is a need to discover new fillers, and in particular fillers derived from waste by-products, that can be blended with HDPE polymers to provide composite materials with improved thermal degradation properties.

In view of the foregoing, one objective of the present disclosure is to provide a polymer composite comprising asphaltenes. It is a further objective to present an application of a by-product of the petroleum refining industry in manufacturing polymer composites with enhanced thermal and mechanical properties.

BRIEF SUMMARY OF THE INVENTION

Accordingly, it is one object of the present invention to provide novel composites of high density polyethylene with by-products of the petroleum refinery industry with superior thermal stability and mechanical properties.

These and other objects, which will become apparent during the following detailed description, have been achieved by the inventors' discovery that certain asphaltenes, when incorporated into a matrix of HDPE polymer in particular amounts, provide composite materials with enhanced thermal stability and mechanical properties compared to non-composited HDPE polymers.

According to a first aspect, the present disclosure relates to a high density polyethylene-asphaltene composite that includes (i) a high density polyethylene (HDPE) polymer in an amount of 85 to 98 wt. %, based on a total weight of the high density polyethylene-asphaltene composite, and (ii) a filler in an amount of 10 wt. % or less, based on a total eight of the high density polyethylene-asphaltene composite, wherein the filler is an asphaltene, the asphaltene is the only filler present, and the asphaltene is uniformly dispersed within a matrix of the HDPE polymer.

In some embodiments, the high density polyethylene-asphaltene composite consists essentially of the HDPE polymer and the asphaltene.

In some embodiments, the high density polyethylene-asphaltene composite consists of the HDPE polymer and the asphaltene.

In some embodiments, the HDPE polymer has a density of 0.941 to 0.965 g/cm$^3$, and a weight average molecular weight of 200,000 to 500,000 g/mol.

In some embodiments, the asphaltene is extracted from Arabian Heavy crude oil.

In some embodiments, the asphaltene has a hydrogen-to-carbon atomic ratio of 1.1 to 1.2.

In some embodiments, the asphaltene comprises 80 to 86 wt. % of carbon atoms, 6.2 to 10.0 wt. % of hydrogen atoms, 15 to 24 ppm of nickel, and 55 to 65 ppm of vanadium, each based on a total weight of the asphaltene.

In some embodiments, the asphaltene has a ratio of aliphatic carbons to aromatic carbons of 1.5:1 to 3:1, and a ratio of aliphatic hydrogens to aromatic hydrogens of 8:1 to 14:1.

In some embodiments, the asphaltene has a weight average molecular weight, determined by gel permeation chromatography, of 1,800 to 1,900 g/mol.

In some embodiments, the asphaltene is present in an amount of 2 wt. % to 7.5 wt. % based on the total weight of the high density polyethylene-asphaltene composite. In some embodiments, the asphaltene is present in an amount ranging from 2 wt. % to 5 wt. % based on the total weight of the high density polyethylene-asphaltene composite.

In some embodiments, the high density polyethylene-asphaltene composite has a crystallite size of 19 to 25 nm.

In some embodiments, the high density polyethylene-asphaltene composite has a corrected degree of crystallinity, $X_{c,cor}$, of 60.2 to 64.0%.

In some embodiments, the high density polyethylene-asphaltene composite has which has at least two of the following properties: a tensile strength of 32.5 to 35 MPa, a yield strength of 18.5 to 19.0 MPa, a max load of 189 to 200 N, an elongation at break of 615 to 850%, and a modulus of elasticity of 840 to 910 MPa, as determined by ASTM D638-02a.

In some embodiments, the high density polyethylene-asphaltene composite has a thermal degradation at 50% conversion, $T_{50}$%, of 450 to 470° C., an activation energy for thermal degradation, E, of 350 to 400 kJ/mol, or both, as determined by thermogravimetric analysis.

According to a second aspect, the present disclosure relates to a method of preparing the high density polyethylene-asphaltene composite of the present invention, the method involving melting the HDPE polymer to obtain a molten polymer, blending the molten polymer with the asphaltene to obtain a blended mixture, and hot pressing the blended mixture.

In some embodiments, the molten polymer is blended with the asphaltene at a rotor speed of 50 to 100 rpm and at a temperature of 180 to 210° C.

In some embodiments, the blended mixture is hot pressed at a temperature of 180 to 210° C. under a pressure of 5 to 15 MPa.

In some embodiments, the asphaltene is derived from Arabian Heavy crude oil, and the asphaltene comprises 80 to 86 wt. % of carbon atoms, 6.2 to 10.0 wt. % of hydrogen atoms, 15 to 24 ppm of nickel, and 55 to 65 ppm of vanadium, each based on a total weight of the asphaltene.

In some embodiments, the asphaltene is present in an amount ranging from 2 wt. % to 5 wt. % based on the total weight of the high density polyethylene-asphaltene composite.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
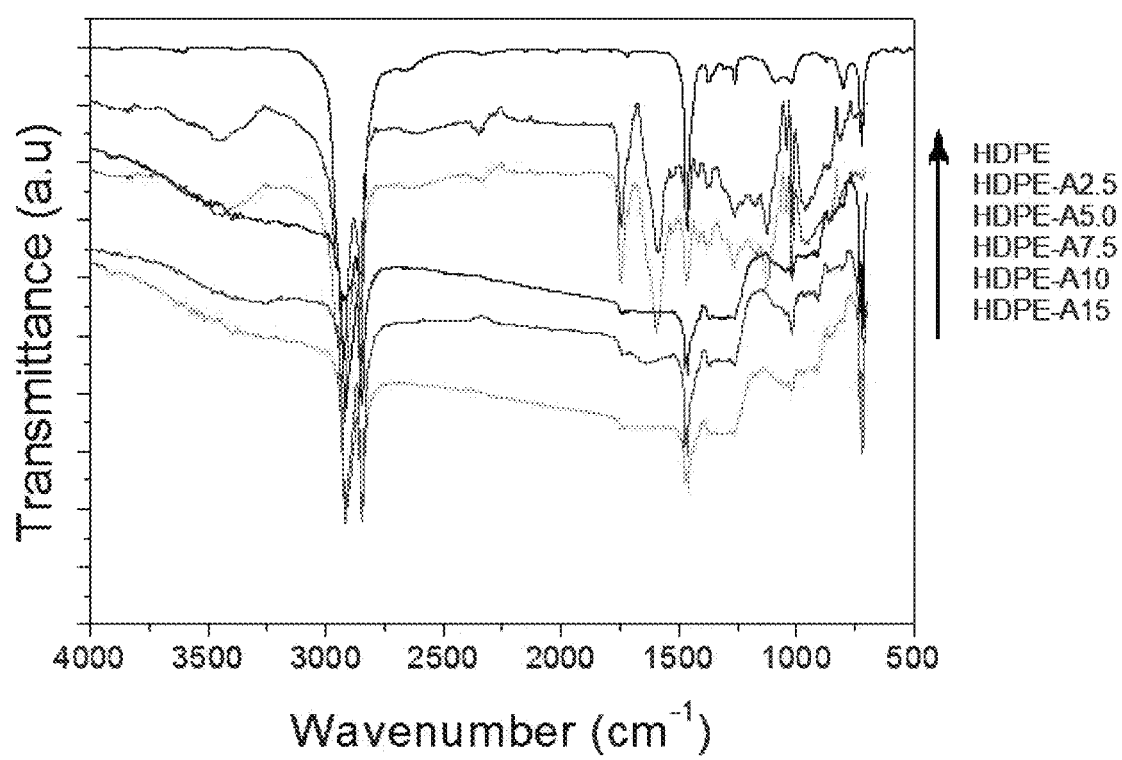
FIG. 1 shows a FTIR spectra of LDPE and LDPE/asphaltenes composites with different amount of asphaltenes.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt. %).

The phrase "substantially free", unless otherwise specified, describes an amount of a particular component (e.g., low density polyethylene), that when present, is present in an amount of less than about 1 wt. %, preferably less than about 0.5 wt. %, more preferably less than about 0.1 wt. %, even more preferably less than about 0.05 wt. %, relative to a total weight of the composition being discussed, and also includes situations where the composition is completely free of the particular component (i.e., 0% wt.).

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the high density polyethylene-asphaltene composite or the methods for making said material. The term "consisting of" describes aspects of the invention in which only those features explicitly recited in the claims are included and thus other components not explicitly or inherently included in the claim are excluded.

A weight percent of a component, unless specifically stated to the contrary, is based on the total weight of the formulation or composition in which the component is included. For example if a particular element or component in a composition is said to have 8 wt. %, it is understood that this percentage is in relation to a total compositional percentage of 100%, unless stated otherwise.

High Density Polyethylene-Asphaltene Composite

The present disclosure relates to a high density polyethylene-asphaltene composite that includes a high density polyethylene (HDPE) polymer and a filler wherein the filler is an asphaltene.

Polymer

High density polyethylene (HDPE) is a polyethylene thermoplastic commonly made from petroleum. With a high strength-to-density ratio, HDPE is used in the production of plastic bottles, corrosion-resistant piping, geomembranes, plastic lumber, among many other uses. HDPE has minimal polymer chain branching, which makes it quite different from other polyethylene products such as low density polyethylene (LDPE). In preferred embodiments, the HDPE employed herein has about 2 to 10, preferably 3 to 9, preferably 4 to 8, preferably 5 to 7 branches per 1000 carbon atoms. The differences in branching between various forms of polyethylene results in products with distinct density. HDPE has a density of 0.941 to 0.965 g/cm$^3$, preferably 0.945 to 0.960 g/cm$^3$, preferably 0.95 to 0.955 g/cm$^3$, preferably about 0.953 g/cm$^3$, and because it is denser than other forms of polyethylene such as LDPE, HDPE also tends to be more rigid and less permeable. The HDPE used herein typically has a weight average molecular weight of 200,000 to 500,000 g/mol, preferably 250,000 to 450,000 g/mol, preferably 300,000 to 400,000 g/mol, although weight average molecular weights outside of this range may also be employed depending on the application, for example, molecular weights up to 3,000,000 g/mol, preferably up to 2,000,000 g/mol, preferably 1,000,000 g/mol. In some embodiments, the HDPE polymer utilized has a melt flow index of 0.2 to 3.0 g/10 min, preferably 0.4 to 2.5 g/10 min, preferably 0.6 to 2.0 g/10 min.

The difference in branching between HDPE (low branching) and LDPE (high branching) can also be seen with differential scanning calorimetry (DSC), where HDPE presents a unimodal crystallization peak while LDPE presents bimodal crystallization peaks which is an indication of the existence of crystallites with varying thickness due to the high degree of branching. It has been discovered that the distinct low-branching structure and resulting properties of HDPE make it particularly well suited for compositing with large, planar, aromatic fillers such as asphaltenes compared to other polyethylene polymers including, but not limited to, low density, polyethylene (LDPE), linear low density polyethylene (LLDPE), medium density polyethylene (MDPE), ultra-high molecular weight polyethylene (UHMWPE), crosslinked polyethylene (XLPE), and the like. Basic characteristics of these other polyethylene polymers are described below for comparative purposes.

Of the different polyethylene forms, low density polyethylene (LDPE) has the most excessive branching, with about 20 to 60 branches per 1000 carbon atoms. This results in a less compact molecular structure making the material less dense with a density of 0.910 to 0.925 g/cm$^3$ and a melt flow index of 0.3 to 2.6 g/10 min.

Linear low density polyethylene (LLDPE) has a significant number of short branches. Because it has shorter and more branches, its chains are able slide against each other upon elongation without becoming entangled. LLDPE has a higher tensile strength and higher impact and puncture resistance than the LDPE. LLDPE has a density of 0.91 to 0.94 g/cm$^3$ and a melt flow index of 0.1 to 10.0 g/10 min.

Medium density polyethylene (MDPE) has less branching then LDPE with an intermediate density (0.926 to 0.940 g/cm$^3$) in between that of HDPE and LDPE. MDPE has a melt flow index of 1.0 to 2.0 g/10 min.

Ultra-high molecular weight polyethylene (UHMWPE) has extremely long chains, with molecular weight numbering usually between 2 to 6 million. The bonds between the chains are not very strong owing to the chain length, but this high number of bonds give UHMWPE high tensile strength. The longer chains serve to transfer load more effectively to the polymer backbone by strengthening intermolecular interactions. This causes the material to be very tough and gives it the highest impact strength of the polyethylenes. UHMWPE has a density of 0.928 to 0.941 g/cm$^3$.

Crosslinked polyethylene (XLPE) has covalent bonds between polyethylene chains formed from the use of heat, chemical treatments, and/or radiation, to form 3-dimensional polymers with high molecular weights.

While the composite material can be made in theory from a mixture of high density polyethylene and one or more other polymer types (i.e., the composited polymer can be a copolymer such as a random or a block copolymer), in preferred embodiments, the polymer is a HDPE homopolymer (i.e., contains only a single type of repeat unit). For example, the polymer preferably contains only repeating units that can be classified as high density polyethylene. When other types of polymers (other than HDPE) are present, the polymer preferably contains at least 90 wt. %, preferably at least 95 wt. %, preferably at least 99 wt. % HDPE, relative to a total weight of the polymer material. In preferred embodiments, the high density polyethylene-asphaltene composite of the present disclosure does not contain as the polymer component other forms of polyethylene (e.g., LDPE) or other polyolefin polymers such as polypropylene, either as stand-alone polymers or as copolymers with the HDPE.

Further, pristine HDPE may be employed in the composite materials herein, or alternatively, aged/recycled or treated HDPE polymers may be employed. In other words, the HDPE polymer may be purchased or made fresh and the pristine polyolefin, containing unmodified polymerized ethylene, may be directly incorporated into the high density polyethylene-asphaltene composite. In other embodiments, the HDPE polymer may be obtained by melting used and/or aged and/or recycled HDPE materials and incorporating said used/aged/recycled HDPE material into the high density polyethylene-asphaltene composite. The used/aged/recycled material may contain a relatively intact polyethylene backbone with some degree of degradation in the form of backbone cleavage and/or surface functionalization (e.g., alcohol, aldehyde, carboxylate, carboxylic acid). In some embodiments, the HDPE polymer employed may be treated or chemically modified HDPE. The HDPE polymer may be treated with a hydroxide base such as sodium or potassium hydroxide, treated with a mineral acid such as HCl, sulfuric acid, and/or nitric acid, treated with an organic acid such as citric acid, formic acid, acetic acid oxalic acid, and the like, or oxidized with a strong oxidant such as a peroxide, ozone, and corona discharge applications, to change its properties or 'activate' its binding properties by providing reactive surface functionality (e.g., alcohol, aldehyde, carboxylate, carboxylic acid surface functional groups).

The HDPE polymer can be made from or obtained from any synthesis method known to those of ordinary skill in the art. For example, the HDPE polymer can be formed by catalyst controlled polymerization using a Ziegler-Natta organometallic catalyst (e.g., titanium compounds with an aluminium alkyl), a metallocene catalyst, or an inorganic compound, for example, a Phillips-type catalyst such as chromium(VI) oxide on silica. The branching and chain length of the HDPE polymer can be controlled by controlling the polymerization reaction conditions, for example, by catalyst selection and by controlling the ratio of hydrogen to ethene, the reaction pressure (a typical value is 10-80 atm), and the reaction temperature, as well as any other process parameter known by those of ordinary skill in the art.

The high density polyethylene (HDPE) polymer may be included in the composite in an amount of 85 to 99 wt. %, preferably 85 to 98 wt. %, preferably 90 to 98 wt. %, preferably 92.5 to 98 wt. %, preferably 95 to 97.5 wt. %, based on a total weight of the high density polyethylene-asphaltene composite.

Polyethylene composites are used in many applications to improve the mechanical properties such as tensile strength, tensile modulus and flexural strength of non-composited polyethylene polymers. For example, various types of fillers (described hereinafter) have been used effectively for reinforcing certain polyethylene polymers. However, due to the differences in polyethylene branching, it is often difficult to predict how different fillers will interact with different polymers, especially fillers that also tend to have indistinct and varied structure such as the case with asphaltenes. For example, in the case of LDPE and HDPE, despite being made up of the same repeating unit, these polymers have different structures and properties, and so the amount or type of filler best suited for one polymer does not necessarily provide guidance for the amount or type of filler useful in the other polymer.

Asphaltene

Asphalt is a crude and inexpensive material, and is a by-product of petroleum refining. Asphalt is a colloidal system similar to petroleum, but with lighter molecules removed. Asphalt can be fractionated into 4 major components: saturates, aromatics, resins and asphaltenes. The fractionated part of saturates and aromatics is considered as gas oil. Polarity of these four fractions can be arranged as: saturates<aromatics<resin<asphaltenes. Different sources have different quantities of saturates, aromatics, resins, and asphaltenes. For example, from western Canadian oils saturates may be from 8 to 17 wt. % relative to the total oil, aromatics may be from 36 to 44 wt. % relative to the total oil, resins may be from 18 to 27 wt. % relative to the total oil, asphaltenes may be from 5 to 20 wt. % relative to the total oil; from Arabian oils saturates may be from 22 to 25 wt. % relative to the total oil, aromatics may be from 26 to 50 wt. % relative to the total oil, resin may be 10 to 18 wt. % relative to the total oil, and asphaltenes may be 30 to 36 wt. % relative to the total oil; and from Sumatran oils, saturates from 44 to 46 wt. % relative to the total oil, aromatics may be from 30 to 33 wt. % relative to the total oil, resins may be from 15 to 17 wt. % relative to the total oil, asphaltenes may be from 7 to 10 wt. % relative to the total oil. Oils from different regions have different characterizations based on saturates, aromatics, and resins, and asphaltenes, thus the asphaltenes extracted from these sources also have differing compositions.

Asphaltenes are a distinct chemical component of asphalt (they are different than asphalt), and impart high viscosity to crude oils, negatively impacting production. In general, asphaltenes are organic compounds which are large, planar, aromatic, contain hetero-atoms, and participate in pi-pi stacking. Two types of structures have been postulated: (a) the "continent" or island structure and (b) the "archipelago" structure. The continent structure (a) represents asphaltene as relatively flat disk shape molecules with a dominantly aromatic core (usually consisting of more than seven rings) and a periphery of aliphatic chains. The archipelago structure (b) contains small aromatic groups (up to four rings) which may be connected to each other by aliphatic chains with carbon numbers up to 24. Asphaltenes can be isolated based on solubility by solvent extraction and other methods. Asphaltenes are insoluble in low-boiling saturated hydrocarbons, such as petroleum naphtha, pentane and hexane, but are soluble in carbon tetrachloride and carbon disulfide. Asphaltenes are usually separated from the solvent in the form of a coarse brown-black powder having essentially no cohesiveness.

The chemical composition of asphaltene varies by source. The asphaltenes employed in the present disclosure may be extracted from Arabian Heavy crude oil, Arabian Medium crude oil, or Arabian Light crude oil. Preferably, the asphaltenes are extracted from Arabian Heavy crude oil. Compared to asphaltenes obtained from other sources, Arabian Heavy asphaltenes have a relatively low gravity (e.g. about 27.9° API), a high sulfur content, and a high paraffinic wax content. Other characteristics of preferred Arabian Heavy asphaltenes used in the present disclosure are discussed below.

Asphaltenes contain varying amounts of oxygen, sulfur, and nitrogen, and generally have a low hydrogen-to-carbon ratio, which indicates a strongly aromatic nature (benzene has a ratio of about 1.0 and naphthalene about 0.8). Preferred asphaltenes employed herein have a hydrogen-to-carbon atomic ratio (as determined by elemental analysis) ranging from 1.1 to 1.2, preferably 1.15 to 1.2, more preferably 1.18 to 1.19. Furthermore, the asphaltenes used in the present composite material typically have an average molecular weight (Mw), determined by gel permeation chromatography, ranging from 1,700 to 2,000 g/mol, preferably 1,750 to 1,900 g/mol, preferably 1,800 to 1,900 g/mol, more preferably 1,850 to 1,875 g/mol, most preferably about 1,866 g/mol.

Preferred asphaltenes comprise carbon atoms in an amount ranging from 80-86 wt. %, preferably 82 to 85 wt. %, more preferably 83 to 84 wt. %, based on a total weight of the asphaltenes. Of the total carbon content, in preferred embodiments, asphaltenes are employed that have 60 to 70 wt. % aliphatic carbon atoms, preferably 62 to 65 wt. %, more preferably 63 to 65 wt. % aliphatic carbon atoms, and 30 to 40 wt. % aromatic carbon atoms, preferably 35 to 38 wt. %, more preferably 35 to 37 wt. %, each based on the total weight of the carbon atoms present in the asphaltenes. That is, the asphaltenes employed herein preferably have a ratio of aliphatic carbon atoms to aromatic carbon atoms of 1.5:1 to 3:1, preferably 1.6:1 to 2:1, preferably 1.7:1 to 1.8:1.

Preferred asphaltenes also comprise hydrogen atoms in an amount ranging from 6.2 to 10.0 wt. %, preferably 8 to 9 wt. %, preferably 8.2 to 8.5 wt. %, more preferably 8.2 to 8.4 wt. %, based on the total weight of asphaltenes. Of the total hydrogen content, preferably 90 to 95 wt. %, preferably 91 to 94 wt. %, more preferably 91 to 92 wt. % of the hydrogen atoms are attached to aliphatic carbons, and 5 to 10 wt. %, preferably 6 to 9 wt. %, more preferably 8 to 9 wt. %, of the hydrogen atoms are attached to aromatic carbons, each based on the total weight of hydrogen atoms present in the asphaltenes. In some embodiments, the asphaltene employed has a ratio of aliphatic hydrogens to aromatic hydrogens of 8:1 to 14:1, preferably 9:1 to 13:1, preferably, 10:1 to 12:1, most preferably about 11:1.

Besides carbon and hydrogen, asphaltenes also contain several metals in ppm levels, with vanadium and nickel being the most significant metals from an industrial point of view. The non-porphyrin vanadium and nickel occupy either heteroatoms (N, S and O) bonded sites or are strongly associated with the aromatic sheets of asphaltenes via π-π bonding. Preferred asphaltenes have a nickel content ranging from 10 to 30 ppm, preferably 15 to 24 ppm, preferably 15 to 20 ppm, more preferably 18 to 20 ppm, and a vanadium content ranging from 40 to 70 ppm, preferably 50 to 65 ppm, preferably 55 to 65 ppm, more preferably 59 to 61 ppm.

Asphaltenes may be collected from the crude oil residue (e.g., heavy Arabian crude oil residue) and incorporated 'as is' into the composite materials. In other words, the asphaltenes employed in the composite materials may be unmodified asphaltenes which are not subject to additional chemical modification. Alternatively, the asphaltenes obtained from the crude oil residue may be first subject to chemical modification, for example, hydrogenation, partial hydrogenation, oxidation (e.g., peroxides such $H_2O_2$ or mCPBA, ozone, corona discharge), hydroxide base treatment such as sodium or potassium hydroxide, mineral acid treatment such as HCl, sulfuric acid, and/or nitric acid. Treatment with a strong base or acid may affect hydrolysis, esterification, and/or saponification, for example. In a preferred embodiment, unmodified asphaltenes are used.

In preferred embodiments, asphaltene is the only filler present. The asphaltenes may be present in an amount of 10 wt. % or less, preferably 7.5 wt. % or less, preferably 5 wt. % or less, preferably 3 wt. % or less, based on a total weight of the high density polyethylene-asphaltene composite. In preferred embodiments, the asphaltene is present in an amount of 2 wt. % to 7.5 wt. %, preferably 2 wt. % to 5 wt. %, preferably about 2.5 wt. %, based on the total weight of the high density polyethylene-asphaltene composite. As will become clear, it has been unexpectedly found that incorporating lower amounts of asphaltenes (e.g., 2.5 wt. %) provides composite materials with superior thermal stability/resistance properties, while high asphaltene loadings (e.g., 15 wt. %) may negatively affect the mechanical and thermal properties of the high density polyethylene-asphaltene composite.

In preferred embodiments, the asphaltene is uniformly dispersed within a matrix of the HDPE polymer. Once again, it has been found that high asphaltene loadings (e.g., 15 wt. %) may lead to the formation of asphaltene agglomerates, thereby resulting in non-homogeneous (i.e., non-uniform) asphaltene-HDPE mixing. Depending on whether the asphaltene or the high density polyethylene polymer has been modified to contain reactive functional groups, the asphaltene filler may interact with the high density polyethylene polymer via covalent, electrostatic, or mechanical forces. In a preferred embodiment, the HDPE polymer interacts with the filler with van der Waals forces. The asphaltenes may be physically dispersed (i.e., no chemical reactions between the asphaltenes and the polymer) within that HDPE matrix, chemically reacted with the HDPE, or a combination of both. Preferably, the asphaltenes are homogeneously dispersed within the polymer matrix and may disrupt intermolecular interactions between polymer chains.

The asphaltenes contain hydrocarbon chains that may interact with the C—C backbone of polyethylene via van der Waals interactions.

This interaction can be seen by examining the crystallite size of the HDPE-asphaltene composites relative to pristine HDPE as determined by X-ray diffraction. The high density polyethylene-asphaltene composite of the present disclosure preferably has a crystallite size of 19 to 25 nm, preferably 19.5 to 24 nm, preferably 20 to 23 nm, preferably 20.5 to 22 nm, preferably 21 to 21.2 nm. Such crystallite sizes are larger than pristine HDPE, which has a crystallite size of 18.8 nm. Without being bound by theory, the presence of asphaltenes seemingly increases the mobility of the HDPE chains thereby resulting in the larger crystallite sizes.

Optional Ingredients

In some embodiments, the composites may optionally include other ingredients such as fillers (other than asphaltenes), polymerization catalysts and/or by-products of polymerization catalysts (e.g., catalyst used during the polymerization reaction that remains in the polymer), plasticizers, process aids, accelerators, modifiers, processing oils, pigments and dyes, and mixtures thereof. Such ingredients, when present, may be included in the high density polyethylene-asphaltene composite in amounts up to 10 wt. %, preferably up to 5 wt. %, preferably up to 3 wt. %, preferably up to 1 wt. %, preferably up to 0.5 wt. %, relative to the total weight of the HDPE-asphaltene composite.

Non-limiting examples of fillers (other than asphaltenes) that can be included in the composite material herein include, but are not limited to, natural fibers (e.g., cellulose, lignocellulose, lignin); glass fibers (e.g., milled glass fiber); keratin feather fiber; metallic fibers (e.g., carbon fibers, silicon fibers); inorganic oxides (e.g. aluminum oxide, zirconia, titania, iron oxide, magnesium oxide, calcium oxide, silica, quartz); inorganic hydroxides (e.g., hydrotalcite); metal nitrides (e.g., silicon nitride); inorganic salts (e.g. calcium carbonate, silicon carbonate); silicates such as those based on the oxides of lithium, calcium, barium, strontium, magnesium, aluminum, sodium, potassium, cerium, tin, strontium, boron, lead, and mixtures thereof (e.g. talc, kaolin, montmorillonite); metals (e.g., silver); carbonaceous materials (e.g., graphene oxide, carbon nanotubes, graphene, including modified carbonaceous materials such as L-aspartic acid functionalized carbonaceous materials, graphite powder, carbon powder); silica (e.g. silicalites, zeolites, fumed silica powder); asphalt and asphalt powder.

Non-limiting examples of polymerization catalysts include Ziegler-Natta catalysts, titanium oxide residues, chromium on silica catalysts, and metallocenes, as well as by-products of these polymerization catalysts.

Non-limiting examples of plasticizers include phthalates, trimellitates, adipates, sebacates, maleates, benzoates, terephthalates, sulfonamides, organophospahtes, and polyethers. Specific examples include, but are not limited to, bis(2-ethylhexyl) phthalate (DEHP), diisononyl phthalate (DINP), di-n-butyl phthalate (DnBP, DBP), butyl benzyl phthalate (BBzP), diisodecyl phthalate (DIDP), dioctyl phthalate, o-nitrophenyloctylether, trimethyl trimellitate (TMTM), tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM), bis(2-ethylhexyl) adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl terephthalate, 1,2-cyclohexane dicarboxylic acid diisononyl ester, alkyl sulphonic acid phenyl ester (ASE), N-ethyl toluene sulfonamide (o/p ETSA), N-(2-hydroxypropyl) benzene sulfonamide (HP BSA), N-(n-butyl) benzene sulfonamide (BBSA-NBBS), tricresyl phosphate (TCP), tributyl phosphate (TBP), and triethylene glycol dihexanoate.

Polymer processing aids may be those fluoropolymers generally recognized in the melt processing field as being capable of improving melt processability of polymers. The fluoropolymers may be thermoplastic or elastomeric materials. Preferred fluoropolymers include homopolymers or copolymers derived from vinylidene difluoride, hexafluoropropylene, and tetrafluoroethylene monomers. Additionally, other conventional polymer processing additives may be included with the fluoropolymer to impart specific functional features.

Accelerators may include transition metal salts based on iron, cobalt, manganese, cerium, copper or nickel, as well as photosensitizes like anthraquinone or benzophenone derivatives Modifiers may include ionomers, ethylene/butene/1,9-decadiene copolymers, dendritic polyethylene, or any other modifier known by those of ordinary skill in the art, such as those described in U.S. Pat. No. 7,943,700 incorporated herein by reference in its entirety.

Suitable processing oils may include paraffin-type mineral oils, commercially available examples of suitable processing oils include Paralux processing oil and Hydrobrite processing oil, respectively commercially available from Chevron and Crompton.

Exemplary pigments and dyes may include, but is not limited to, indigo, molecular derivatives of indigo, thioindigos, molecular derivatives of thioindigo, anthraquinones, anthrathrones, anthrapyrimidines, monoazos, diazos, azomethines, quinacridones, quinophthalones, diketopyrrolopyrrols, inanthrones, isoindolines, perylenes, perinones, phthalocyanines, pyranthrones, pyrazolo-quinazolones, diphenylmethanes, acridines, xanthenes, triarylmethanes, thiazines, indophenols, indulines, nigrosines, aminoazobenzenes, anilines, benzimidazoles, benzopyrans, quinolines, aminoketones, alizarins, naphthalimides, acridones, anthracenediones, anthrathioxanthenones, carmine, beta carotene, carmine hydrosoluble, turmeric, beet, annato, metal complex dyes, metal complex pigments, azo/metal complexes, a rutile pigment, a spinel pigment, a bismuth vanadate pigment, a cerium sulfide pigment, and combinations thereof.

In most preferred embodiments, the high density polyethylene-asphaltene composite is substantially free of, including completely free of fillers (other than asphaltenes), polymerization catalysts, plasticizers, process aids, accelerators, modifiers, processing oils, and/or pigments and dyes. Further, in preferred embodiments, the high density polyethylene-asphaltene composite is substantially free of any inorganic material. In most preferred embodiments, the high density polyethylene-asphaltene composite consists essentially of or consists of the HDPE polymer and the asphaltene.

Properties

The high density polyethylene-asphaltene composite materials of the present disclosure possess superior and unexpected mechanical and thermal stability properties, which can be clearly seen by comparing the inventive composites to non-composited HDPE polymer, as well as to HDPE polyethylene-asphaltene composites made with a high asphaltene loading (e.g., 15 wt. %).

In some embodiments, the high density polyethylene-asphaltene composite has a corrected degree of crystallinity, $X_{c,cor}$, of 60.2 to 64.0%, preferably 60.5 to 63.5%, preferably 61 to 63.0%, preferably 61.5 to 62.8%, preferably 62 to 62.6%, as calculated from DSC thermograms. The addition of an appropriate amount of asphaltene to the HDPE thus produces a nucleating effect and results in high density polyethylene-asphaltene composites with a higher degree of crystallinity compared to pristine HDPE, which has an $X_{c,cor}$, of 60.0%. Contrarily, adding too much asphaltene (e.g., 15 wt. %) results in a marked drop in $X_{c,cor}$ to crystallinities below pristine HDPE (see Table 3).

Figure 9A:
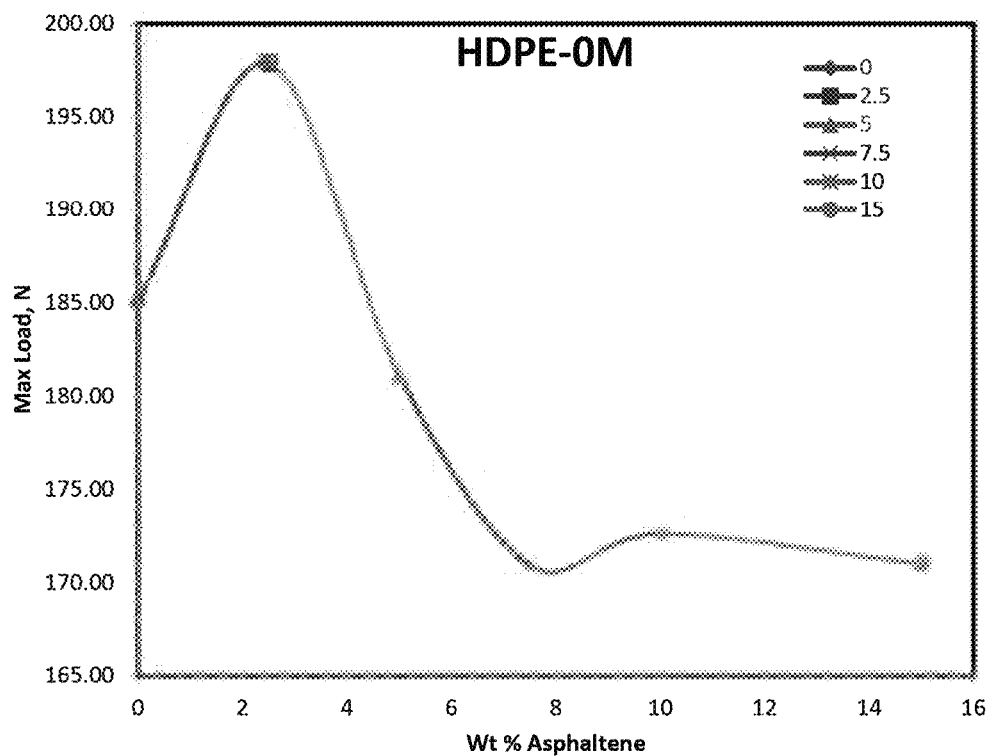
FIG. 9A is a plot showing the effect of adding various amounts of asphaltene to HDPE on the load bearing capacity.
Figure 9B:
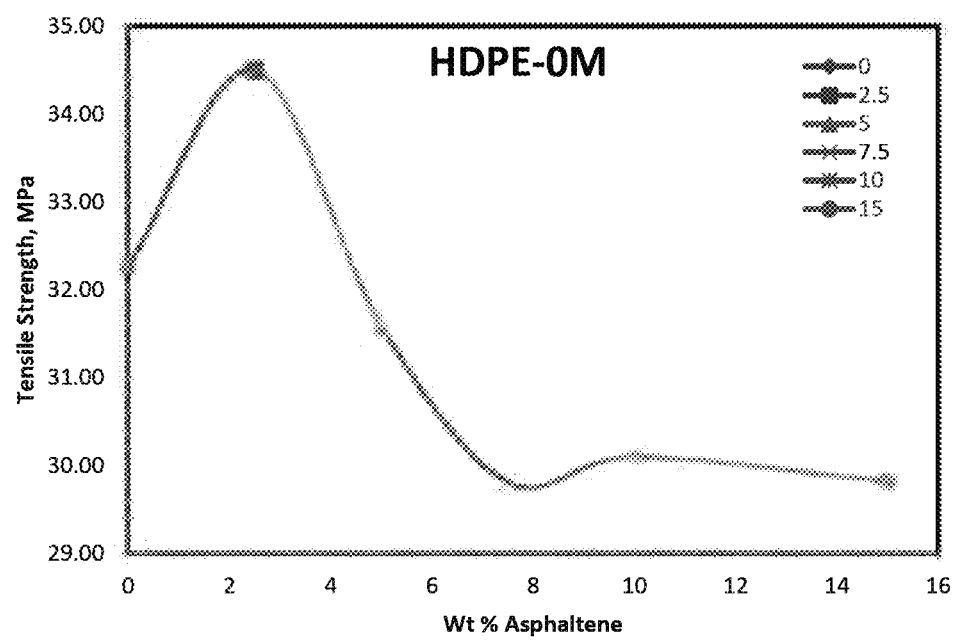
FIG. 9B is a plot showing the effect of adding various amounts of asphaltene to HDPE on the tensile strength.

In some embodiments, the high density polyethylene-asphaltene composite has a tensile strength of 32.5 to 35 MPa, preferably 33 to 34.8 MPa, preferably 34 to 34.6 MPa, preferably about 34.5 MPa, as determined by ASTM standard D638-02a. In some embodiments, the high density polyethylene-asphaltene composite has a max load of 189 to 200 N, preferably 190 to 198 N, preferably 195 to 197.9 N, as determined by ASTM standard D638-02a. Surprisingly, it has been found that the addition less than 4 wt. % asphaltene, for example about 2.5 wt. % asphaltene, provides high tensile strength and high max load composites compared to pristine HDPE, which has a tensile strength of 32.26 MPa and a max load of 185.02 N. In contrast, higher loadings of asphaltene reduces the tensile strength and max load to below pristine HDPE levels (FIGS. 9A and 9B).

Figure 9C:
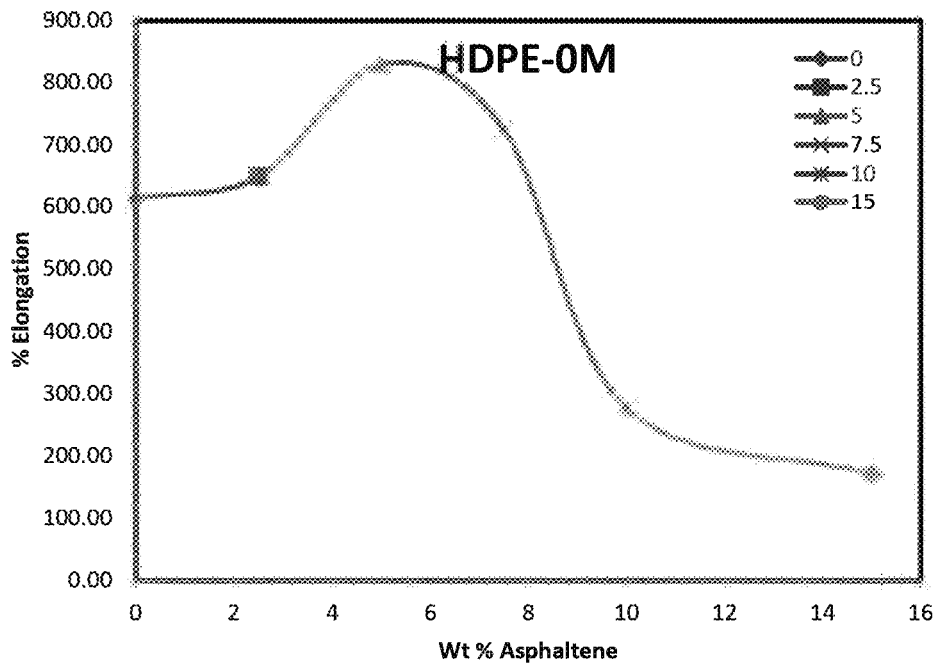
FIG. 9C is a plot showing the effect of adding various amounts of asphaltene to HDPE on the % elongation at break.
Figure 9D:
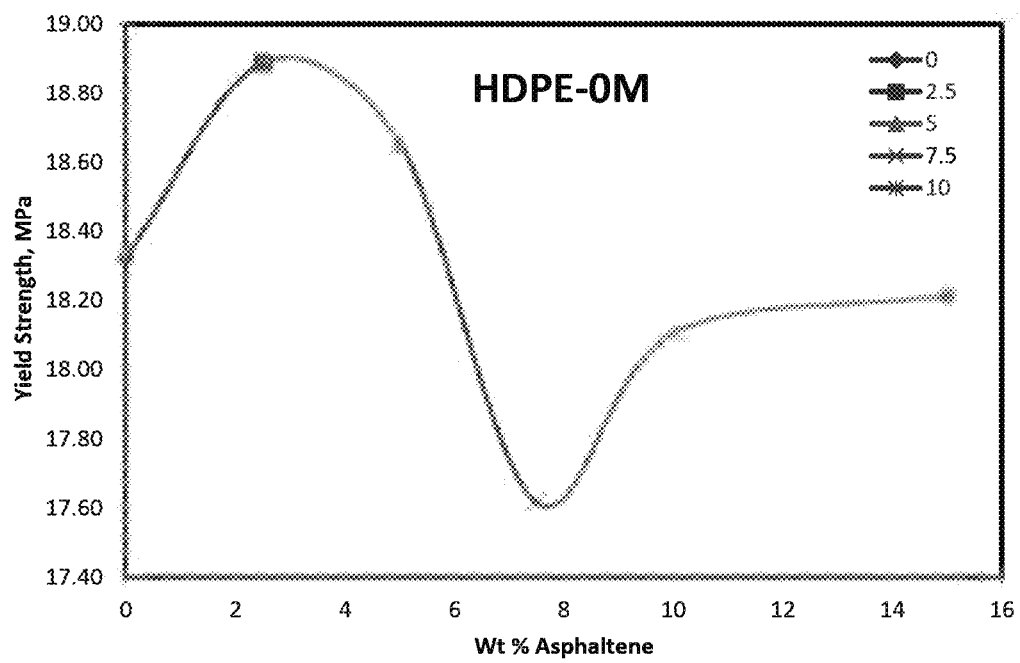
FIG. 9D is a plot showing the effect of adding various amounts of asphaltene to HDPE on the yield strength.

In preferred embodiments, the high density polyethylene-asphaltene composite has a yield strength of 18.5 to 19.0 MPa, preferably 18.6 to 18.95 MPa, preferably 18.7 to 18.9 MPa, as determined by ASTM standard D638-02a. Such a yield strength is superior compared to pristine HDPE (18.32 MPa), and may be achieved with asphaltene loadings of less than 6 wt. %, preferably less than or equal to 5 wt. %, while higher asphaltene loadings result in a decrease in yield strength compared to HDPE. (FIG. 9D)

The high density polyethylene-asphaltene composite of the present disclosure may have an elongation at break of 615 to 850%, preferably 640 to 840%, preferably 700 to 830%, preferably 720 to 820%, as determined by ASTM standard D638-02a, which compares favorably to pristine HDPE which has an elongation at break of 613.4%. Such advantageous elongation at break values can be achieved with asphaltene loadings of less than 8 wt. %, whereas higher asphaltene loadings result in diminished elongation at break percentages. (FIG. 9C)

Figure 9E:
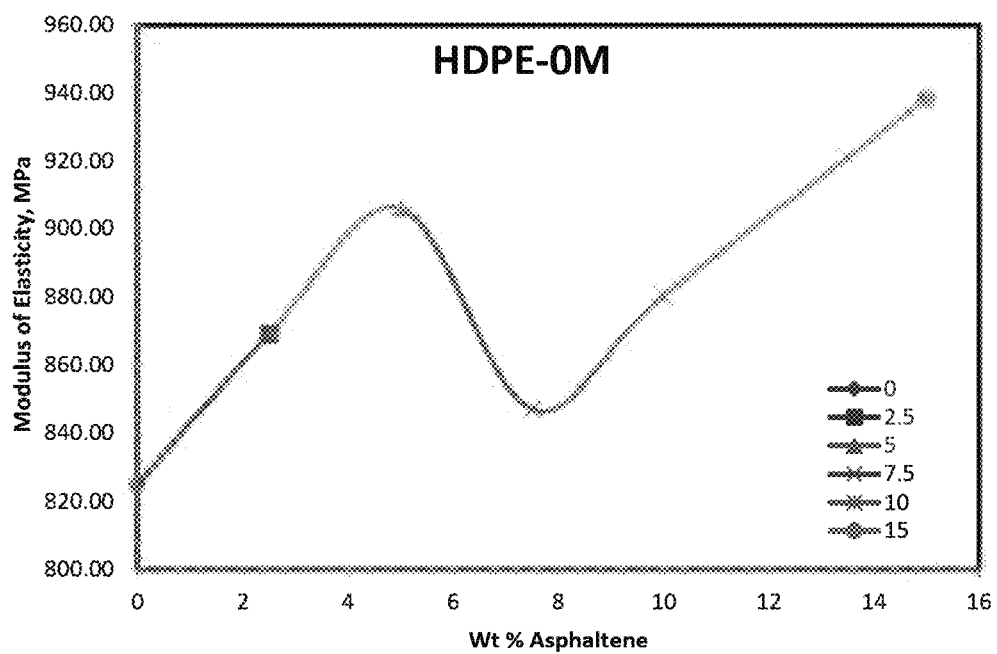
FIG. 9E is a plot showing the effect of adding various amounts of asphaltene to HDPE on the modulus of elasticity.

The high density polyethylene-asphaltene composite may have a modulus of elasticity of 840 to 910 MPa, preferably 850 to 905 MPa, preferably 860 to 900 MPa, as determined by ASTM standard D638-02a, which is favorable compared to pristine HDPE (825 MPa) (FIG. 9E)

In some embodiments, the composite has a peak melting temperature, $T_m$, as determined by DSC, of 132.8 to 134° C., preferably 133 to 133.9° C., or about 133.8° C.

The high density polyethylene-asphaltene composite also has superior and unexpected thermal stability properties compared to pristine HDPE and composites loaded with high asphaltene contents (e.g., 15 wt. %). In some embodiments, the high density polyethylene-asphaltene composite has an initial thermal degradation, $T_2\%$, that is, the temperature where the composite begins to thermally degrade, of 430 to 450° C., preferably 436 to 446° C., preferably 438 to 442° C., as determined by thermogravimetric analysis. Suitable asphaltene loadings thus produce favorable thermal degradation initiation temperatures compared to pristine HDPE (403° C.) and composites with a high asphaltene content (e.g., composites made with 15 wt. % asphaltene has a $T_{2\%}$ of 416° C.). This is particularly surprising since asphaltenes themselves begin to decompose before pristine HDPE (FIG. 5A) In some embodiments, the high density polyethylene-asphaltene composite has a thermal degradation at 50% conversion, $T_{50\%}$, of 450 to 470° C., preferably 460 to 469° C., preferably 465 to 468° C., as determined by thermogravimetric analysis. Suitable asphaltene loadings thus produce favorable thermal degradation mid-way temperatures compared to pristine HDPE (446° C.) and composites with a high asphaltene content (e.g., composites made with 15 wt. % asphaltene has a $T_{50\%}$ of 445° C.).

In some embodiments, the high density polyethylene-asphaltene composite has an activation energy for thermal degradation, E, of 350 to 400 kJ/mol, preferably 360 to 398 kJ/mol, preferably 370 to 395 kJ/mol, as determined by thermogravimetric analysis. As is clear when comparing these activation energy values to pristine HDPE (287 kJ/mol) and composites having a high asphaltene content (e.g., 15 wt. %, E of 264 kJ/mol), appropriate loadings of asphaltenes provides a thermal shielding effect that delays the degradation of the composite induced by heat.

Methods

To make the high density polyethylene-asphaltene composite, the HDPE polymer, in one or more of its embodiments, is first melted to obtain a molten polymer. The HDPE polymer may be loaded into a Brabender Plasti-Corder® Lab-Station, for example, and heated to the melting temperature of the particular HDPE polymer. Typically, the HDPE polymer is heated to at least 120° C., preferably 120 to 210° C., preferably 140 to 200° C., preferably 160 to 180° C., or until sufficient melting occurs. In most cases, the HDPE polymer is melted over the course of 20 minutes or less, 15 minutes or less, 10 minutes or less, 5 minutes or less, or 2 minutes or less, though it is possible to melt the HDPE polymer for longer periods and/or maintain the HDPE polymer in a molten state for longer periods of time prior to moving on to the next stage in the process.

Once the HDPE polymer has been completely melted, a suitable amount of asphaltene is next blended with the molten polymer with mixing to obtain a blended mixture. The asphaltene may be added in one portion, batch-wise, or gradually to the melted polymer, depending on the manufacturing scale or other manufacturing requirements. The addition of asphaltene typically occurs over an addition time of 10 minutes or less, preferably 5 minutes or less, preferably 2 minutes or less, although longer addition times may be used. Preferably, the molten polymer is blended with the asphaltene at a temperature of 180 to 210° C., preferably 185 to 200° C., preferably 190 to 195° C. While it is possible to vary the temperature during the blending stage, the temperature is preferably kept at a constant temperature (i.e., plus/minus 5° C.). In most cases, the mixing speed is kept constant (plus/minus 5 rpm) during the blending process, wherein the molten polymer is blended with the asphaltene at a rotor speed of 50 to 100 rpm, preferably 55 to 90 rpm, preferably 60 to 80 rpm. After all of the asphaltene has been added, it is preferable to continue the mixing for 5 to 20 minutes, preferably 10 to 15 minutes, although it should be recognized that mixing times above these ranges may also be employed without negatively affecting the eventual composite product.

Other parameters of the melt-blending process may be varied as desired to achieve composite materials with desirable properties suitable for a particular application. Such parameters and techniques are known to those of ordinary skill in the art.

Alternatively, the melt-blending process may take place in an extruder, for example, a twin-screw extruder or single screw extruder, where solid HDPE pellets are conveyed from a hopper to the screw and are pushed along the barrel chamber to be heated and converted into molten polymer. Then the molten polymer can be mixed with the asphaltene to form the blended mixture that can be appropriately shaped.

After the melt-blending, the blended mixture may be manipulated/manufactured to have any desired shape. For example, the blended mixture may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the blended mixture may be extruded, molded, compressed, casted, cooled, solidified, etc. to have any desirable shape.

In some embodiments, the blended mixture is extruded by forcing the blended mixture through a particular cross section in an extruder and the resulting extrudate can be cooled to produce the desired shape.

In some embodiments, an injection molding process is performed, whereby the blended mixture is forced into a cold, closed mold cavity by means of high pressure applied hydraulically through a ram or screw type plunger. The blended mixture is then solidified in the cool mold to form the composite material.

In some embodiments, the blended mixture is shaped using rotational molding (rotomolding) whereby the blended mixture is heated in a mold in an oven, then the mold is removed from the oven with biaxial rotation, and the mold and its contents are cooled with water or air. Once the HDPE-asphaltene composite has cooled, the mold can be opened and the product removed.

In preferred embodiments, the blended mixture may be processed using compression molding, such as hot pressing, whereby the blended mixture is placed between stationary and movable molds. Once the mold is closed, heat and pressure may be applied to obtain a homogeneously shaped composite. In some embodiments, the blended mixture is hot pressed at a temperature of 180 to 210° C., preferably 190 to 205° C., preferably 195 to 200° C., and under a pressure of 5 to 15 MPa, preferably 7 to 13 MPa, preferably 9 to 11 MPa, for example using a Carver hot-press. The samples are typically kept in the hot stage for up to 15 minutes, preferably up to 10 minutes, preferably up to 5 minutes, although longer hot pressing times may also be employed. Further, the mold may be preheated in order to reduce the holding time. The hot pressed sample may then be cooled gradually over the course of 2 to 10 minutes, preferably 5 to 8 minutes, or alternatively may be rapidly cooled (quenched) to form the high density polyethylene-asphaltene composite.

After cooling, the composite may be trimmed, smoothed, painted and/or electroplated as needed for a particular use.

It is also envisioned that the high density polyethylene-asphaltene composite may be produced by in situ polymerization method, whereby ethylene is polymerized in the presence of asphaltenes and a polymerization catalyst (e.g., a Zeigler-Natta catalyst) to evenly distribute the asphaltene as the polyethylene chain grows.

The resulting high density polyethylene-asphaltene composite may be used as a replacement for HDPE in various applications where increased thermal resistance is desirable, for example in the of manufacture liquid containers (milk jugs, detergent bottles), butter tubs, garbage containers, water pipes, toys, plastic bottles, corrosion-resistant piping, geomembranes, plastic lumber, etc.

The present embodiments are being described with reference to specific example embodiments and are included to illustrate but not limit the scope of the disclosure or the claims.

EXAMPLES

Separation of Asphaltenes from Arabian Heavy Crude Oil 7.0 g of heavy residue was added to a 200 mL beaker and warmed with a minimal amount of n-heptane to homogenize the sample. The resulting mixture was then carefully transferred to a 2 L Erlenmeyer flask containing 700 mL of n-heptane. The flask was fitted with mechanical stirrer and heated in a water bath at 90° C. and stirred vigorously for 2 hrs in order to maximize the solubility of residue, and then cooled at room temperature for about 24 hrs. The long cooling time produces more efficient precipitation of asphaltenes. The whole content was then filtered with 0.8 μm Millipore filter. All insoluble material was extracted with toluene using the soxhlet apparatus and filtered again using same filtering apparatus. The insoluble material was removed as sludge (coke) and soluble material, asphaltenes, was recovered after evaporating toluene completely. In order to remove any traces of maltenes, the recovered asphaltenes were washed several times with small portions of n-heptane until the washing became colourless and then dried in an oven at 105° C. until constant weight was obtained.

The asphaltenes employed were isolated as n-heptane insoluble materials from the Arab heavy Saudi Arabian crude oils. Arabian Heavy is a relatively low-gravity (27.9° API), high-sulphur, paraffinic wax-containing crude oil. Characteristic properties of the Arab heavy asphaltenes employed is found in Table 1. The asphaltenes have a weight average molecular weight of 1866 g/mol determined by gel permeation chromatography (Ali, M. F., Siddiqui, M. N. and Al-Hajji A. A. Structural Studies on Residual Fuel Oil Asphaltenes by RICO Method, Petroleum Science & Technology, 22(5&6) (2004) 631-645, incorporated herein by reference in its entirety). More detailed characterization can be found in literature (M. N. Siddiqui. Catalytic pyrolysis of Arab Heavy residue and effects on the chemistry of asphaltene. J. Anal. Appl. Pyrolysis. 89 (2010) 278-285—incorporated herein by reference in its entirety).

TABLE 1

Composition of asphaltenes derived from Arabian Heavy crude oil.

| Element | Amount |
| --- | --- |
| C (%) | 83.22 ($C_{aromatic}$ 36.0%, $C_{aliphatic}$ 64.0%) |
| H (%) | 8.25 ($H_{aromatic}$ 8.1%, $H_{aliphatic}$ 91.9%) |
| Ni (ppm) | 19 |
| V (ppm) | 60 |

Preparation of HDPE/Asphaltene Composites

HDPE was melt blended with different weight percentages of asphaltenes as filler using a Brabender plasticoder at 190° C. for 10 min at a rotor speed of 60 rpm. The polymer was first melted for 2 min. In the next 2 min, the filler was added into the molten polymer. After complete addition of the filler the mixing was continues for another 6 min. During the mixing, the temperature and torque were consistent. The blended mixtures were then hot pressed at 200° C. under a pressure of 9 MPa using Carver hot-press. The samples were kept in the hot stage for 5 min. Then it was cooled for 10 more min.

The relative amounts of HDPE and asphaltenes together with the code name of each sample appear in Table 2.

TABLE 2

Relative amounts of HDPE and asphaltenes and code number of each composite

| Sample | HDPE:Asphaltenes (wt. %) |
| --- | --- |
| HDPE | 100:0 |
| HDPE-A2.5 | 97.5:2.5 |
| HDPE-A5.0 | 95.0:5.0 |
| HDPE-A7.5 | 92.5:7.5 |
| HDPE-A10 | 90:10 |
| HDPE-A15 | 85:15 |

Characterization of the HDPE/Asphaltene Composites

Fourier Transform Infra-Red (FTIR) Spectroscopy.

For the characterization of the chemical structure of the pristine HDPE and its composites, FTIR spectroscopy was used. The instrument used was an FTIR spectrometer of Perkin-Elmer, Spectrum One. Due to the opacity of the samples, the Attenuated Total Reflectance (ATR) device (plate ZnSe 45°) was employed. The resolution of the equipment was 4 cm$^{-1}$ and the recorded wavenumber range was from 4000 to 700 cm$^{-1}$ and 32 spectra were averaged to reduce the noise.

Thermogravimetric Analysis (TGA).

For the determination of the thermal stability of the composites, TG analysis was performed on a Pyris 1 TGA (Perkin Elmer) thermal analyzer equipped with a sample pan made of Pt. Samples of about 5-8 mg were used. They were heated from ambient temperature to 550° C. at a heating rate 20° C./min, under a 20 ml/min nitrogen flow.

Differential Scanning Calorimetry (DSC).

Thermal properties of the composites were measured using DSC. The Instrument used was the DSC-Diamond from Perkin-Elmer. The sample mass was approximately 5.5 mg in all measurements. The experimental conditions of the measurements included the following steps: Heat from 30° C. to 190° C. at 20° C./min. Hold at 190° C. for 2 min. Cool from 190 to −40° C. at 20° C./min. Hold at −40° C. for 2 min. Heat from −40 to 190 at 20° C./min. All melting temperature results are from the second heating to eliminate thermal history of the sample. Crystallization was recorded during cooling from the melt.

X-Ray Diffraction (XRD).

X-ray diffraction (XRD) patterns of HDPE and its composites were obtained from an XRD-diffractometer (model Richard Seifert 3003 TT, Ahrensburg, Germany) with a CuKa radiation for crystalline phase identification ($\lambda$=0.15405 nm for CuKa). The scanning range, 2θ, of the samples was from 5 to 50°, at steps of 0.05 and counting time of 5 s.

Tensile Mechanical Properties.

Tensile test specimens were made from molded plates of HDPE filled with various compositions of Asphaltene. Dumbbell-shaped tensile-test specimens were used. The values of the yield stress, tensile strength, and elongation at break were determined according to the guidelines provided in ASTM standard D638-02a. Five specimens were tested for each sample, and the average values are reported.

FTIR Spectra

FTIR spectra of all samples appear in FIG. 1. The presence of the traditional absorption bands appearing in polyethylene was recorded. These are: high intensity peaks at 2852 and 2922 cm$^{-1}$ attributed to the stretching vibration of the chain methylene (—$CH_2$) groups, (stretching of C—H bonds), at 1467 cm$^{-1}$ bending vibrations of symmetric methylene groups (C—H) and at 721 cm$^{-1}$ corresponding to —$CH_2$ rocking (deformation and elongation mode of $CH_2$ group). In the composites almost the same spectra were recorded, since the same characteristic chemical groups appear in the asphaltenes as in HDPE and they are mainly C—H bonds in either —$CH_2$ or —$CH_3$. Saturation appearing in some spectra is due to the high opacity of the samples with high amounts of asphaltenes.

Melting and Crystallization Behavior

Figure 2A:
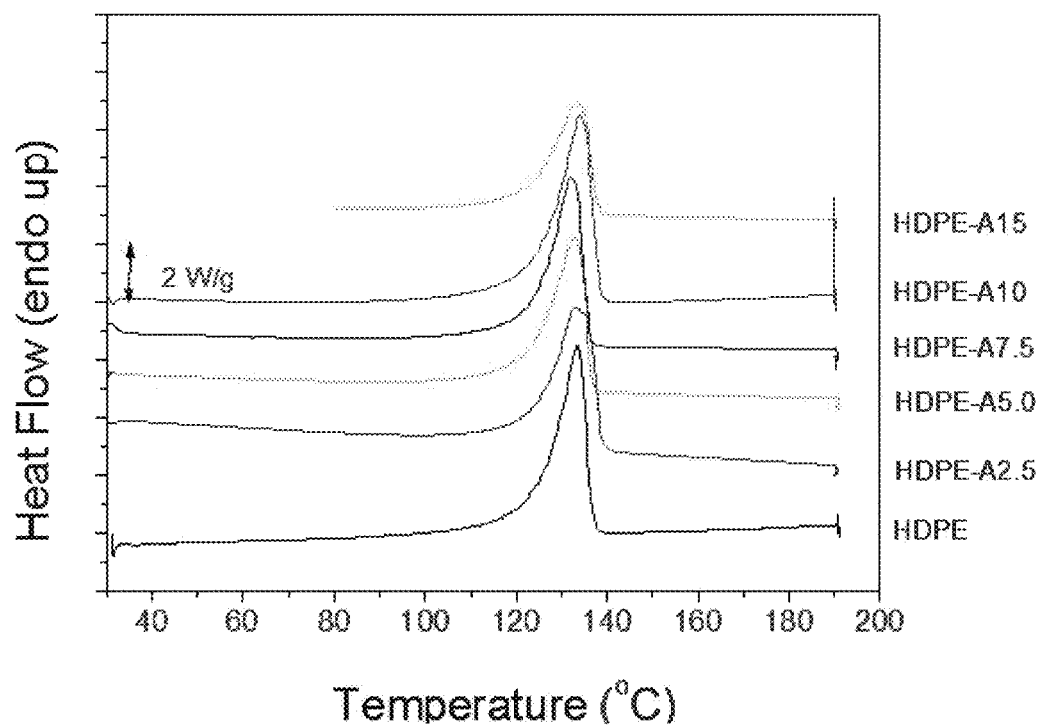
FIGS. 2A and 2B shows DSC scans of pristine HDPE and its composites with various amounts of asphaltenes obtained during a first heating (FIG. 2A) and second heating (FIG. 2B) to evaluate the melting temperature and heat of fusion.
Figure 2B:
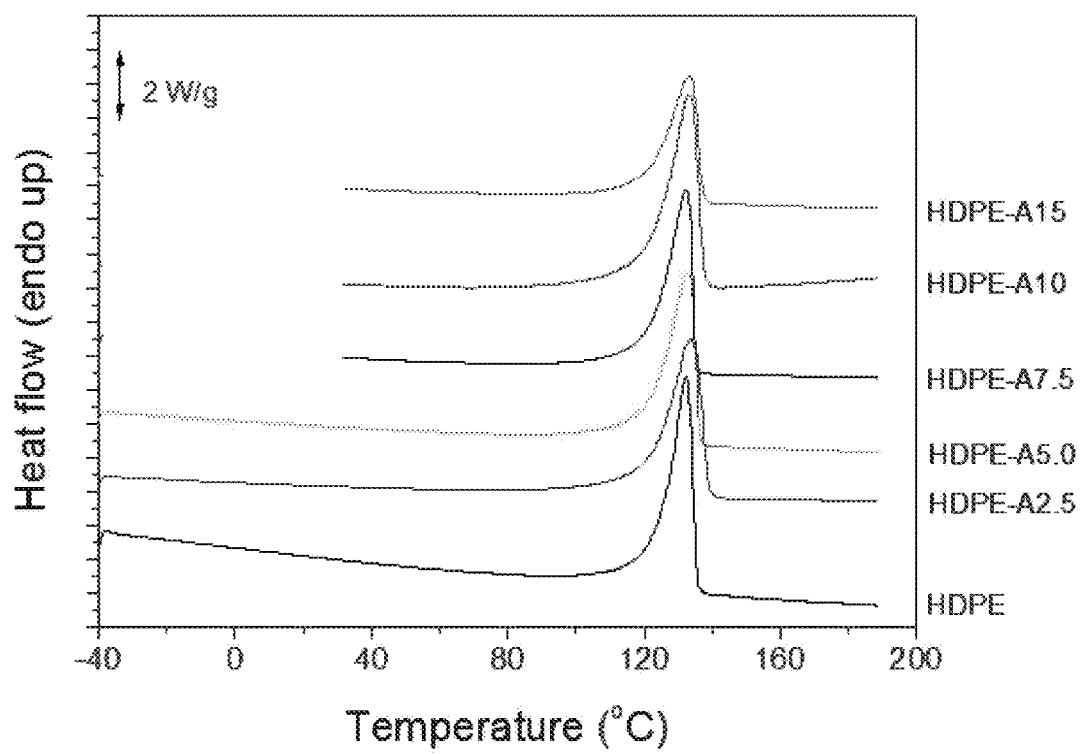

In order to study the melting behavior of pristine HDPE and all its composite materials, DSC thermograms were recorded and results obtained during the first and second heating are depicted in FIGS. 2A and 2B. The melting peak temperature, $T_m$, and the total heat of fusion obtained from these curves are reported in Table 3. $T_m$ for pristine HDPE was estimated at 132.5° C., which is a typical value, in the range of 131 to 134° C., reported in literature for this polymer [Kord, B., Ravanfar, P., Ayrilmis, N. J. Polym. Environ. Published online 23 Nov. 2016. DOI 10.1007/s10924-016-0897-x; Roy, A., Joshi, M., Butola, B. S., Srivastava, A. K. Silver-loaded HDPE/clay nanocomposites with antibacterial property. Polym. Compos. 2017, 39: E366-E377; Lino, A. S., Mendes, L. C., da Silva, D.de F., Malm, O. High density polyethylene and zirconium phosphate nanocomposites. Polimeros, 25(5), 477-482, 2015—each incorporated herein by reference in its entirety]. As it can be seen all curves are similar and most of the samples melt at approximately 133° C., except of HDPE-A2.5, where a slightly higher value, near 134° C. was measured.

However, a substantial change in the enthalpy of fusion for the composites can be observed which is directly linked to the degree of crystallinity. In particular, $\Delta H_m$ of the composites was always lower than the pristine HDPE decreasing with the amount of asphaltenes added, except for the HDPE-A2.5 sample, where a value slightly higher than HDPE was measured. The lower melting enthalpy measured for the samples with higher than 2.5 wt. % asphaltenes was also reflected in lower total heat released during crystallization from this sample and as a result of lower crystallinity of the whole composite. Though if one wants to know the crystallinity of the polymer itself, the relative amount of the polymer in the composite has to be taken into consideration, according to the following equation providing the corrected degree of crystallinity, $X_{c,cor}$ of each composite:

$$X_{c,cor} = \frac{\Delta H_m}{\Delta H_m^0 w} 100 \qquad (1)$$

Where, $\Delta H_m$ is the heat of fusion of HDPE and its composites, $\Delta H_m^0$ is the heat of fusion for 100% crystalline HDPE taken equal to 293.6 J/g and w is the weight fraction of HDPE in the composites.

From the corrected degree of crystallinity, values reported in Table 3, it seems that HDPE-A2.5 composite has a slightly higher crystallinity compared to pristine HDPE, whereas composites HDPE-A5, HDPE-A7.5 and HDPE-A10 have values similar to pristine HDPE. Thus, it seems that addition of 2.5 wt. % asphaltenes in the polymer matrix has a nucleating effect. Adding higher amounts (i.e. 15% of asphaltenes) result in a significant reduction in the crystallinity of the polymer. It seems that the addition of asphaltenes in HDPE is beneficial to the crystallization of HDPE only until the amount of 2.5%. Therefore, this value seems to be the optimum concerning the nucleating effect of asphaltenes in the HDPE matrix.

Figure 3:
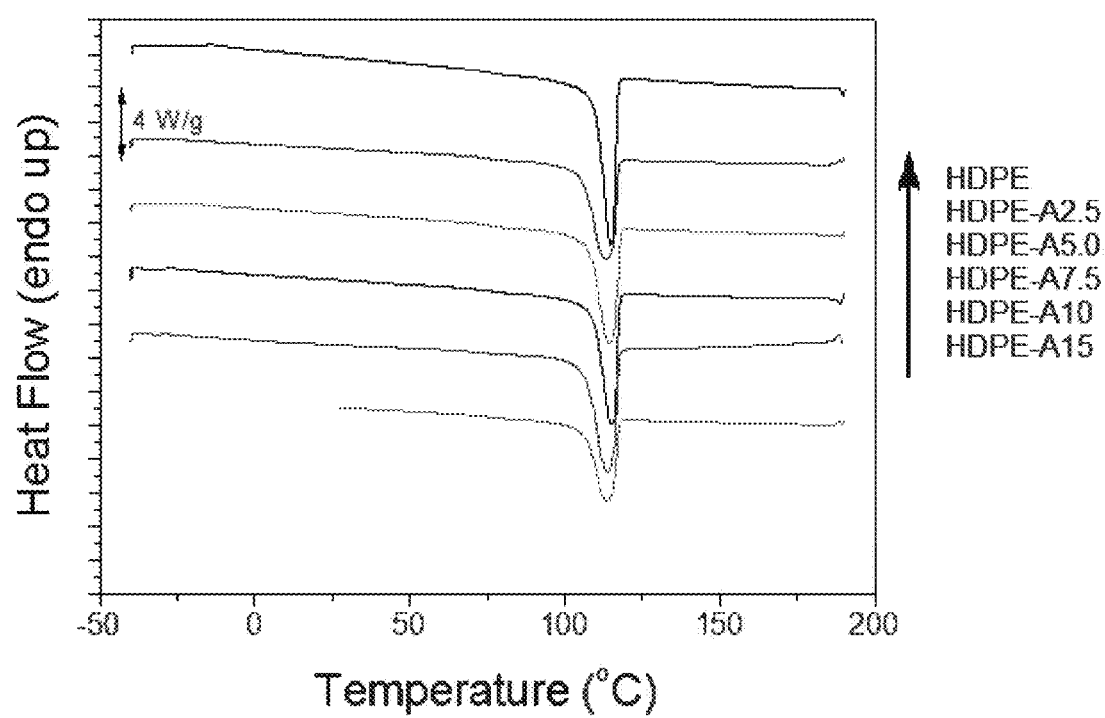
FIG. 3 shows DSC thermograms of pristine HDPE and its composites with various amounts of asphaltenes obtained during cooling to estimate melt crystallization.

Crystallization of the samples was also recorded during cooling from the melt. Results on the crystallization exotherm, $\Delta H_c$ and crystallization temperature, $T_c$ appear in FIG. 3 and Table 3. One clear and sharp exothermic peak was recorded emerging at 115° C. Similar values have been reported also in literature [Kord, B., Ravanfar, P., Ayrilmis, N. J. Polym. Environ. Published online 23 Nov. 2016. DOI 10.1007/s10924-016-0897-x; Roy, A., Joshi, M., Butola, B. S., Srivastava, A. K. Silver-loaded HDPE/clay nanocomposites with antibacterial property. Polym. Compos. 2017, 39: E366-E377; Lino, A. S., Mendes, L. C., da Silva, D.de F., Malm, O. High density polyethylene and zirconium phosphate nanocomposites. Polimeros, 25(5), 477-482, 2015—each incorporated herein by reference in its entirety]. In contrast to HDPE, LDPE usually presents two crystallization peaks, which is an indication of existence of crystallites with various thicknesses, and also an indication of a high degree of branching found in LDPE. More branched chains form more defected and less stable crystals that form at lower temperature. Crystallization enthalpy of the composites with the higher amounts of asphaltenes, i.e. 10 and 15%, is much lower compared to neat HDPE, confirming the results obtained during heating.

TABLE 3

Results from DSC measurements.

| Sample | $T_m$ (° C.) | $\Delta H_m$ (J/g) | $T_c$ (° C.) | $\Delta H_{cryst}$ (J/g) | $X_c$ (%) | $X_{c,cor}$ (%) |
|---|---|---|---|---|---|---|
| HDPE | 132.5 | 176.1 | 114.8 | 170.5 | 60.0 | 60.0 |
| HDPE-A2.5 | 133.8 | 179.0 | 113.1 | 177.5 | 61.0 | 62.5 |
| HDPE-A5 | 132.8 | 168.0 | 114.5 | 171.5 | 57.2 | 60.2 |
| HDPE-A7.5 | 132.4 | 165.5 | 115.4 | 170.2 | 56.4 | 60.9 |
| HDPE-A10 | 133.1 | 162.0 | 113.7 | 167.4 | 55.2 | 61.3 |
| HDPE-A15 | 133.4 | 135.3 | 113.4 | 142.0 | 46.1 | 54.2 |

Figure 4:
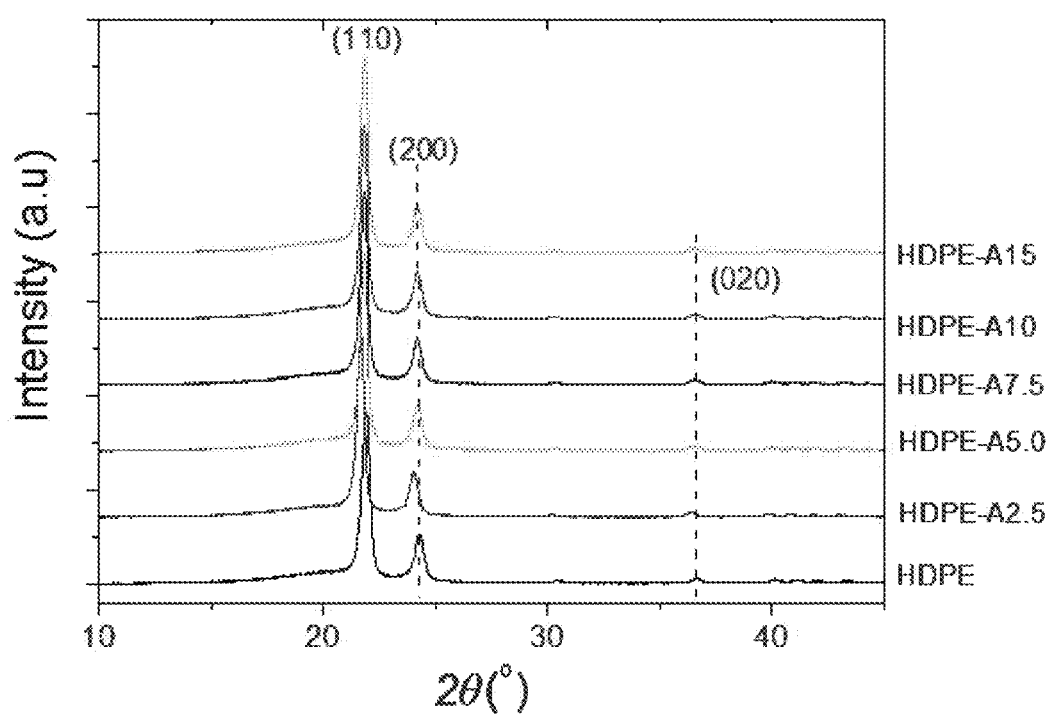
FIG. 4 shows an XRD spectra of HDPE and HDPE/asphaltene composites with different amounts of the additive.

$T_m$ melting peak temperature during $2^{nd}$ heating,
$\Delta H_m$ melting enthalpy,
$T_c$ crystallization peak temperature,
$\Delta H_c$ crystallization enthalpy,
$X_c$ degree of crystallinity and
$X_{c,cor}$ corrected degree of crystallinity WAXD Examinations FIG. 4 shows the X-ray diffraction (XRD) patterns of pristine HDPE and its composites. The pristine HDPE mainly exhibits a strong reflection peak at $2\theta=21.9°$, followed by a less intensive peak at 24.3° and a weak at 36.7°, which correspond to the typical orthorhombic unit cell structure of (110), (200) and (020) reflection planes, respectively. These $2\theta$ values are in good agreement with the reported values of HDPE [Roy, A., Joshi, M., Butola, B. S., Srivastava, A. K. Silver-loaded HDPE/clay nanocomposites with antibacterial property. Polym. Compos. 2017, 39: E366-E377]. The two crystalline characteristic peaks (110) and (200) remain almost unchanged after the incorporation of the asphaltene, indicating that the addition of the asphaltenes did not affect the original crystal structure of the HDPE matrix. The crystallinity and crystal structure, as it is recorded by the position, the intensity and the width of the peaks, of almost all composites were nearly identical. Only composite HDPE-A2.5 presented a shift to slightly lower angles.

The crystallite size (L) can be obtained by the Scherrer's formula from the half-width of (110) diffraction peak:

$$L = \frac{K\lambda}{b\cos(\theta)} \quad (2)$$

where, K is a constant assumed to be 0.94 for Full Width at Half Maxima (FWHM) of spherical crystals with cubic symmetry, $\lambda$ is the wavelength of X-ray beam (0.154 nm), b is FWHM in radians and $\theta$ is the angle at the dominant peak (around 21.9°).

Results on the FWHM and the crystallite size, L estimated for all samples appear in Table 4. It can be seen that the crystallite size of all composites is similar around 21 nm, while slightly higher compared to pristine HDPE. It seems that the presence of asphaltenes slightly increases the mobility of the HDPE chains resulting in the slight increase of the crystallite size.

TABLE 4

Characteristic peaks and calculated crystallite size, L, for pristine HDPE and its composites obtained from WAXD measurements.

| Sample | $2\theta$ (°) | | | FWHM (radians) | L (nm) |
|---|---|---|---|---|---|
| HDPE | 21.9 | 24.3 | 36.7 | 0.0078 | 18.8 |
| HDPE-A2.5 | 21.7 | 24.0 | 36.4 | 0.0070 | 21.1 |
| HDPE-A5.0 | 21.8 | 24.2 | 36.6 | 0.0072 | 20.6 |
| HDPE-A7.5 | 21.8 | 24.2 | 36.6 | 0.0072 | 20.6 |
| HDPE-A10 | 21.8 | 24.2 | 36.6 | 0.0070 | 21.1 |
| HDPE-A15 | 21.8 | 24.2 | 36.6 | 0.0072 | 20.6 |

Thermogravimetric Analysis

Figure 5A:
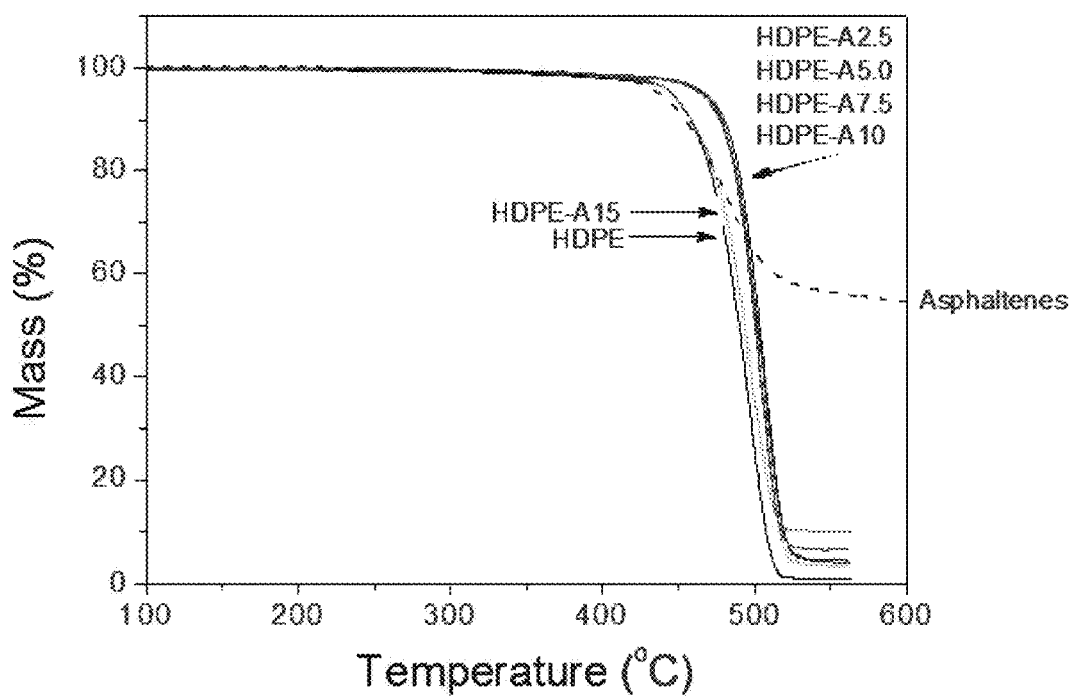
FIGS. 5A and 5B are thermal degradation curves (FIG. 5A) of pristine HDPE and HDPE/asphaltenes composites with different relative amounts, and the corresponding differential TG curve (FIG. 5B) obtained from TGA scans at 10° C./min.
Figure 5B:
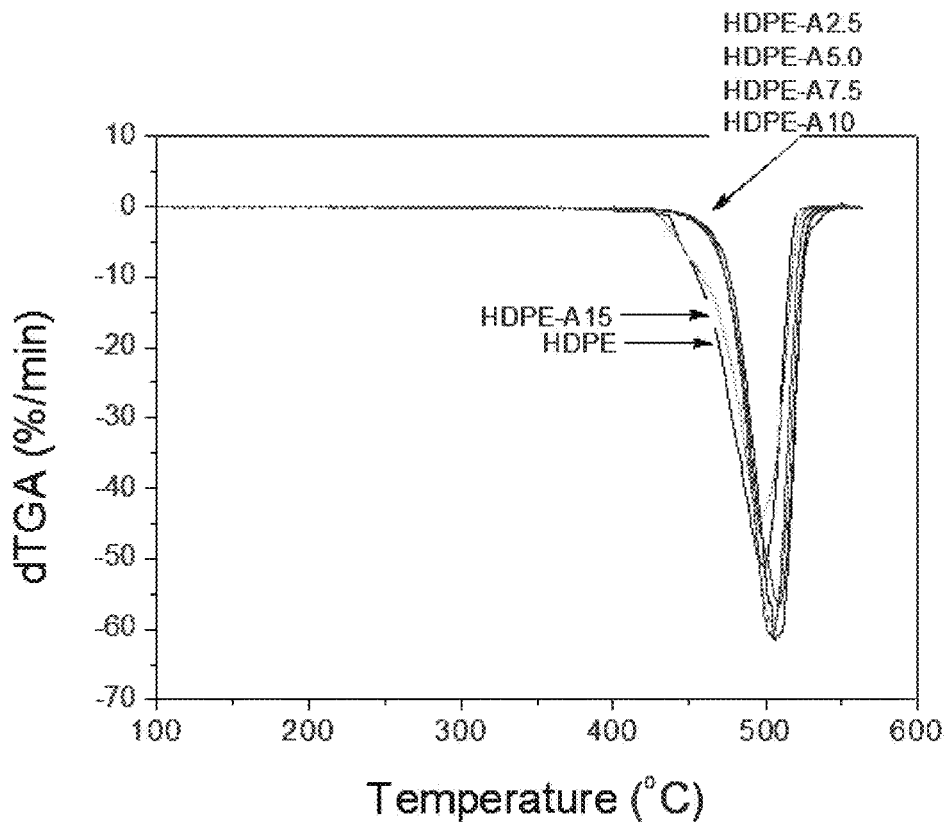
Figure 6:
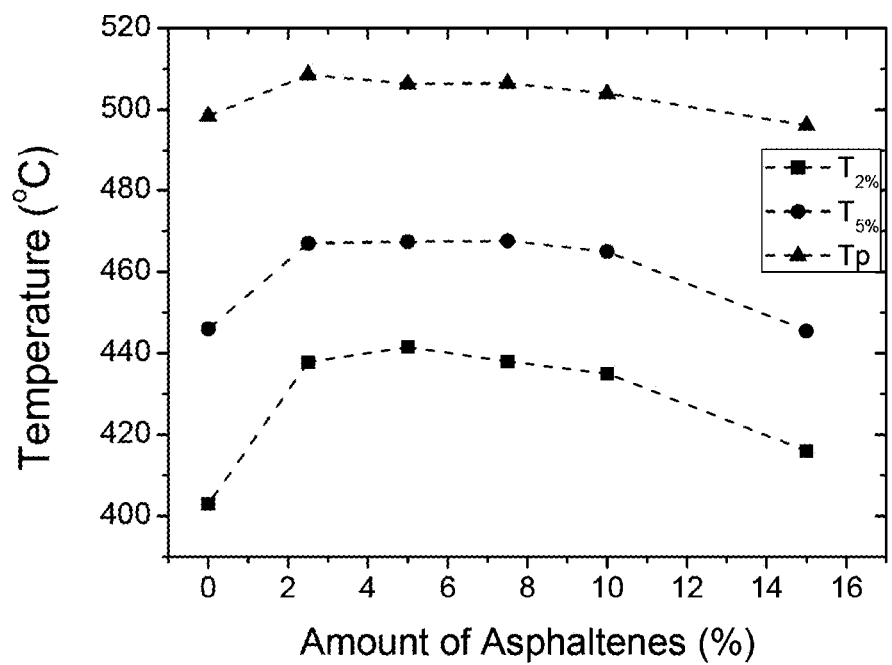
FIG. 6 is a plot of the variation of characteristic thermal degradation temperatures with the amount of asphaltene added in HDPE/asphaltene composites.

Thermal stability of neat HDPE and its composites with different amounts of asphaltenes appears in FIG. 5A. The corresponding differential TG curves appear in FIG. 5B. As it can be seen, degradation completes in one-step in all different samples and all composites present curves shifted to higher temperature values compared to pristine HDPE. This means that the addition of asphaltenes results in composite materials having better thermal stability compared to neat HDPE. HDPE thermally degrades to volatile products leaving a residue of around 1.0% at 600° C. through a radical chain process, whose onset (T %) and maximum weight loss rate temperature ($T_p$) are around 403 and 498° C., respectively. The initial decomposition temperature of all composites is shifted to higher temperatures compared to pristine HDPE ($T_{2\%}$ in Table 5) confirming the protecting role of the asphaltenes in relation to the thermal stability of HDPE. The higher $T_{2\%}$ temperature was recorded in the HDPE-A5 composite, meaning incorporation of 5 wt % asphaltenes in the HDPE matrix. Moreover, from the temperatures where degradation reaches 50% ($T_{50\%}$), as well as where the peak in the degradation rate appears ($T_p$), it seems that best thermal stability is achieved in the HDPE-A2.5, HDPE-A5 and HDPE-A7.5 composites, i.e. with 2.5, 5 or 7.5 wt. % of the additive. The variation of these characteristic degradation temperatures with the amount of asphaltenes added is illustrated in FIG. 6.

It seems that the addition of asphaltenes at these concentrations forms a protective layer (thermal shield) around the polymer, which delays the degradation induced by heat, and acts as a thermal barrier limiting the emission of the gaseous degradation products. Moreover, the increase of thermal stability can be attributed to the hindered diffusion of volatile decomposition products by the asphaltenes in the polymer matrix. The latter form torturous paths, which inhibit the passage of volatile degradation products from the polymer matrix [Kord, B., Ravanfar, P., Ayrilmis, N. J. Polym. Environ. Published online 23 Nov. 2016. DOI 10.1007/s10924-016-0897-x—incorporated herein by reference in its entirety].

Concerning the residual mass (char yield); it was found to be near 1 and 56% for pristine HDPE and asphaltenes, respectively. For the composites, as expected, the char yield increased with increasing amount of asphaltenes. From the knowledge of the char yield of the individual components, i.e. setting $C_{HDPE}=0.01$ and $C_{asph}=0.56$, an attempt was made to calculate the theoretical char yield using the rule of mixtures and the weight fractions of HDPE and asphaltenes, $w_{HDPE}$ and $w_{asph}$, according to the following equation:

$$\text{Char yield} = w_{HDPE}C_{HDPE} + w_{asph}C_{asph} \quad (3)$$

Results are included in Table 5 and are in good agreement with corresponding experimental data.

Therefore, the most effective protection seems to be achieved with an amount near 5 wt. %. Higher amount of asphaltene added (i.e. 15%) reduces the thermal stability of the composite. It is believed that the homogeneous dispersion of asphaltenes results in trapping the volatilizing matrix from escape to the atmosphere. Higher amount of asphaltenes, form agglomerates resulting in a non-homogeneous mixture.

TABLE 5

Thermal degradation properties

| Sample | $T_{2\%}$ | $T_{50\%}$ | $T_p$ | Residue at 600° C. (%) | | E (kJ/mol) | $R^2$ |
| --- | --- | --- | --- | --- | --- | --- | --- |
| | | | | exper. | theoret. | | |
| HDPE | 403 | 446 | 498 | 1.0 | 1.0 | 287 ± 1 | 0.9969 |
| HDPE-A2.5 | 438 | 467 | 508 | 3.1 | 2.4 | 395 ± 2 | 0.9969 |
| HDPE-A5.0 | 442 | 467 | 506 | 3.3 | 3.7 | 376 ± 1 | 0.9982 |
| HDPE-A7.5 | 438 | 468 | 506 | 4.5 | 5.1 | 382 ± 2 | 0.9942 |
| HDPE-A10 | 435 | 465 | 504 | 6.6 | 6.5 | 373 ± 3 | 0.9919 |
| HDPE-A15 | 416 | 445 | 496 | 9.9 | 9.3 | 264 ± 2 | 0.9935 |

Temperature where thermal degradation starts ($T_2$), at 50% conversion ($T_{50\%}$) and at the degradation peak ($T_p$), residue obtained theoretically from equation (3) and measured at 600° C., as well as activation energy of the thermal degradation according to equation (6) of pristine HDPE and HDPE/asphaltenes composites.

Usually, the thermal degradation mechanism begins at weak link sites along the polymer chain once a thermally induced scission has occurred. Four possible weak link structures within the polyethylene chain have been reported, namely: peroxides, carbonyls, chain branches, and unsaturated structures, with most dominant being the peroxide groups formed during polymer preparation, storage and processing. Although random scission is a primary degradation pathway in polyethylene, it can also result in polymer chain branching. Both scission and branching occur simultaneously giving rise to a single mass loss step (as those observed in FIGS. 5A and 5B). According to Vyazovkin et al. [Peterson, J. D., Vyazovkin, S., Wight, C. A. Kinetics of the thermal and thermo-oxidative degradation of polystyrene, polyethylene and poly(propylene). Macromol. Chem. Phys. 202(6), 775-784, 2001—incorporated herein by reference in its entirety], who used integral advanced isoconversional methods, a variation in the activation energy, Ea, of the thermal degradation with conversion takes place. This suggests that the degradation kinetics is governed by different processes at the initial and final stages. The initial lower value of the activation energy is most likely associated with the initiation process that occurs at the weak links. As these weak links are consumed, the limiting step of degradation shifts towards the degradation initiated by random scission. This type of degradation typically has greater activation energy. Therefore, a maximum value of Ea at 240 kJ/mol was measured as an estimate of the activation energy for the degradation initiated by random scission.

In this investigation a simple single-step reaction model, was employed to estimate constant activation energy throughout degradation. The resulting value can be considered as an average value over the corresponding regions of temperature and extent of reaction. Broido [Broido, A. A simple sensitive graphical method of testing thermogravimetric analysis data. J. Polym. Sci.: Part A-2 7, 1761-1773 (1969)—incorporated herein by reference in its entirety] used a dimensionless mass index, y, defined as $$y = \frac{m_t - m_f}{m_0 - m_f} \qquad (4)$$

Where $m_t$, $m_f$ and $m_0$ refer to the mass of the sample at any time, final and initial value, respectively.

Then, using the typical $n^{th}$ order reaction kinetic model $$\frac{dy}{dt} = -k\, y^n \qquad (5)$$

after a number of assumptions, including that n was set equal to 1 ($1^{st}$ order thermal degradation) and an Arrhenious-type expression for the temperature-dependence of the kinetic rate constant, k, the following linear expression can be obtained to estimate the activation energy, E, of the degradation process:

$$\ln\left[\ln\left(\frac{1}{y}\right)\right] = -\frac{E}{R}\frac{1}{T} + Const \qquad (6)$$

Figure 7:
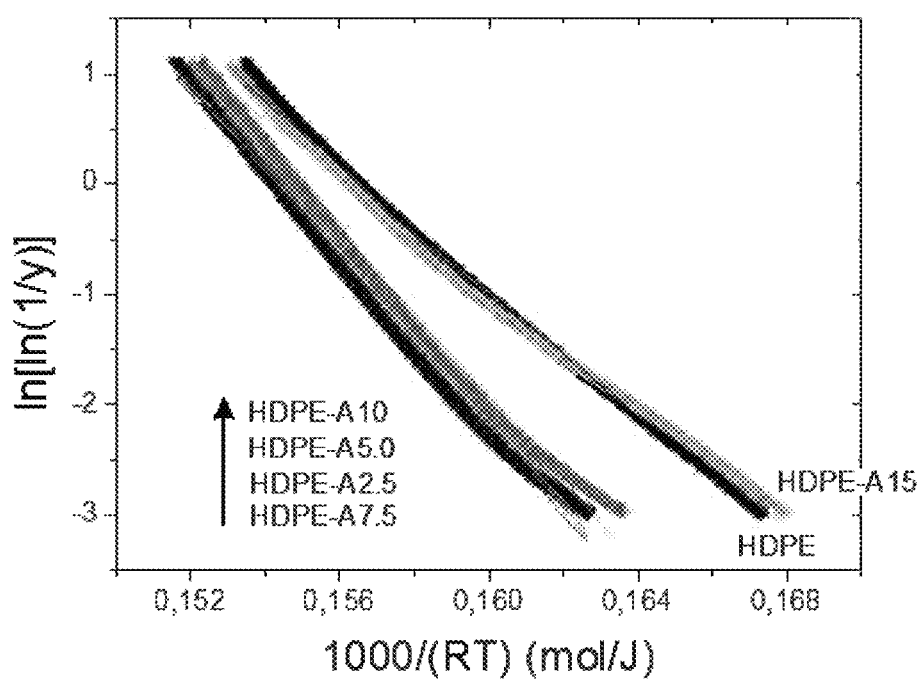
FIG. 7 is a plot estimating the activation energy of the thermal degradation of HDPE and the HDPE/asphaltene composites according to equation (6).

A plot of ln[ln(1/y)] vs 1/T in the interval of 5-95% for HDPE and the composites appears in FIG. 7. Very good straight lines were obtained for all the materials investigated. This means that the assumption of $1^{st}$ order kinetic degradation model hold at the specific mass degradation interval studied. From the slope of these curves, the activation energy can be obtained and values estimated are included in Table 5. The value calculated for pristine HDPE was 287 kJ/mol. This value is similar to the average value 290 kJ/mol estimated by Sinfronio et al. [Sinfronio, F. S., Santos, J. C., Pereira, L. G., Souza, A. G., Conceicao, M. M., Fernandes Jr., V. J., Fonseca, V. M. Kinetic of thermal degradation of LDPE and HDPE by non-isothermal thermogravimetry. J. Therm. Anal. Calorim. 79, 393-399 (2005)—incorporated herein by reference in its entirety] and Araujo et al. [Araujo, A. S., Fernandes Jr., V. J., Fernandes, G. J. T. Thermogravimetric kinetics of polyethylene degradation over silicoaluminophosphate. Thermochim Acta 392-393, 55-61 (2002)—incorporated herein by reference in its entirety] for HDPE using different isoconversional methods and models at several heating rates. Though it is higher than that proposed by Beltrame et al. [Beltrame, P. L., Carniti, P., Audisio, G. and Bertini, F., 1989. Catalytic degradation of polymers: Part II—Degradation of polyethylene. *Polymer Degradation and Stability,* 26(3), pp. 209-220—incorporated herein by reference in its entirety] (273 kJ/mol), Aboulkas et al. [Aboulkas, A., K. El Harfi, A. El Buadili, Energy Conversion and Management 51(7):1363-1369—incorporated herein by reference in its entirety] (i.e. from 238 to 247 kJ/mol) and the mean value estimated by Vyazovkin et al. [Peterson, J. D., Vyazovkin, S., Wight, C. A. Kinetics of the thermal and thermo-oxidative degradation of polystyrene, polyethylene and poly(propylene). Macromol. Chem. Phys. 202(6), 775-784, 2001—incorporated herein by reference in its entirety] using the integral isoconversional methods (i.e. 240 kJ/mol). Differences in the activation energy can be attributed to several different properties of the polymer, including its average molecular weight, degree of crystallinity, etc. For instance, it is well known that the effective activation energy of polyethylene degradation tends to increase with the average molecular weight.

The activation energies estimated for all the HDPE/asphaltene composites, except HDPE-A15, were larger compared to pristine HDPE. Values are included in table 5. Larger activation energies denote that the reaction is more unfavorable from a kinetic point of view. Therefore, thermal degradation is retarded by the presence of the filler and the thermal stability of the material is enhanced. This is another indication that the addition of asphaltenes serve as a thermal barrier delaying the kinetics of the thermal degradation of the material. Inclusion of large amount of asphaltenes (i.e. 15%) results in a material similar to pristine HDPE from a degradation point and exhibiting lower activation energy compared to HDPE.

Mechanical Properties of HDPE-Asphaltene Composites

Figure 8:
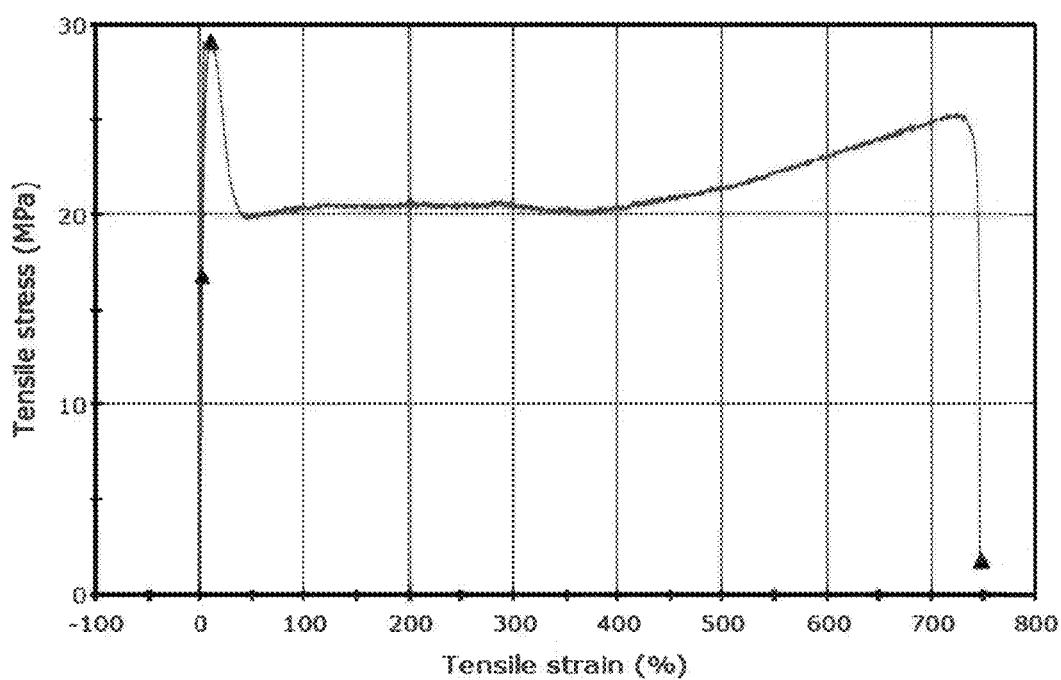
FIG. 8 is a typical stress—strain curve of HDPE with 5 wt. % Asphaltene.

A typical Stress vs Strain data of HDPE/asphaltenes composite with 5 wt. % filler is shown in FIG. 8.

The results for mean values of material properties are shown in FIGS. 9A-9E.

As shown in the case of HDPE, tensile strength, and yield strength are not experiencing any significant change with the addition of Asphaltene as shown in FIGS. 9B and 9D. Modulus of elasticity of HDPE is increasing as the Asphaltene concentration is increased as illustrated in FIG. 9E. Therefore, HDPE is becoming stiffer with the increased concentration of Asphaltene. This trend is more observed as the Asphaltenes concentration is greater than 7.5%. This trend is in compatible with the sharp decline in % elongation of HDPE as Asphaltene is more than 7.5% as shown in FIG. 9C.

It seems that the best additive-matrix adhesion resulting in the highest tensile strength and yield strength, as well as max load is obtained at a relative amount of asphaltene equal to 2.5 wt. % (FIGS. 9A, 9B, and 9D). When a high content of asphaltene was incorporated, its dispersion in the HDPE matrix becomes more difficult resulting in lower tensile strength. The increase in the tensile strength of the HDPE-A2.5 composite and the subsequent decrease with the addition of high amounts of asphaltenes probably is also associated to the increase and subsequent decrease of the degree of crystallinity, as observed in DSC analysis.

Several composites of HDPE with different amounts of asphaltenes ranging from 2.5 to 15 wt. % were prepared by the melt-mixing technique. From the analysis of their properties, it was found that the addition of asphaltenes does not alter the chemical characteristics of the matrix polymer, HDPE, as it comes from FTIR measurements showing almost the same absorbance peaks. In addition, composites were found to retain almost the same melting and crystallization temperature, while the enthalpy of fusion and crystallization decrease significantly with the amount of asphaltene added. Special properties were found from the composite containing 2.5 wt. % asphaltenes, which presented a higher degree of crystallinity compared to pristine HDPE, as measured from DSC scans, as well as higher crystallite size as it came from WAXD measurements. The addition of asphaltenes does not seem to alter significantly the mechanical tensile properties of the material, while only the composite with 2.5 wt. % was found to have improved tensile and yield strength. Finally, a significant enhancement of the thermal stability of the composites with 2.5, 5 and 7.5 wt. % asphaltenes compared to neat HDPE was recorded. Specifically, the initial thermal degradation temperature increased by almost 40° C. as it came from TGA measurements where degradation of the composites shifted to higher values. In addition, the thermal degradation activation energy of HDPE and the composites was estimated assuming a first order kinetic model. The activation energy of neat HDPE was estimated at 287 kJ/mol, whereas that of the above-mentioned composites significantly increased. This is another indication that the addition of asphaltenes into HDPE serve as a thermal barrier delaying the kinetics of the thermal degradation of the material. Inclusion of large amount of asphaltenes (i.e. 15%) results in a material similar to pristine HDPE from a degradation point of view, exhibiting lower activation energy compared to HDPE.

It seems that the most advantageous amount of asphaltenes that could be added in the HDPE is around 2.5 wt. % resulting in the best dispersion in the polymeric matrix, larger crystallite size, higher relative degree of crystallinity, improved mechanical tensile properties and significantly enhanced thermal stability.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A high density polyethylene-asphaltene composite, comprising:
   a high density polyethylene (HDPE) polymer n an amount of 85 to 98 wt. %, based on a total weight of the high density polyethylene-asphaltene composite; and
   a filler in an amount of 10 wt. % or less, based on a total weight of the high density polyethylene-asphaltene composite;
   wherein:
   the filler is an asphaltene,
   the asphaltene is the only filler present, and
   the asphaltene is uniformly dispersed within a matrix of the HDPE polymer.

2. The high density polyethylene-asphaltene composite of claim 1, which consists essentially of the HDPE polymer and the asphaltene.

3. The high density polyethylene-asphaltene composite of claim 1, which consists of the HDPE polymer and the asphaltene.

4. The high density polyethylene-asphaltene composite of claim 1, wherein the HDPE polymer has a density of 0.941 to 0.965 g/cm$^3$, and a weight average molecular weight of 200,000 to 500,000 g/mol.

5. The high density polyethylene-asphaltene composite of claim 1, wherein the asphaltene is extracted from Arabian Heavy crude oil.

6. The high density polyethylene-asphaltene composite of claim 1, wherein the asphaltene has a hydrogen-to-carbon atomic ratio of 1.1 to 1.2.

7. The high density polyethylene-asphaltene composite of claim 1, wherein the asphaltene comprises 80 to 86 wt. % of carbon atoms, 6.2 to 10.0 wt. % of hydrogen atoms, 15 to 24 ppm of nickel, and 55 to 65 ppm of vanadium, each based on a total weight of the asphaltene.

8. The high density polyethylene-asphaltene composite of claim 7, wherein the asphaltene has a ratio of aliphatic carbons to aromatic carbons of 1.5:1 to 3:1, and a ratio of aliphatic hydrogens to aromatic hydrogens of 8:1 to 14:1.

9. The high density polyethylene-asphaltene composite of claim 1, wherein the asphaltene has a weight average molecular weight, determined by gel permeation chromatography, of 1,800 to 1,900 g/mol.

10. The high density polyethylene-asphaltene composite of claim 1, wherein the asphaltene is present in an amount of 2 wt. % to 7.5 wt. % based on the total weight of the high density polyethylene-asphaltene composite.

11. The high density polyethylene-asphaltene composite of claim 1, wherein the asphaltene is present in an amount ranging from 2 wt. % to 5 wt. % based on the total weight of the high density polyethylene-asphaltene composite.

12. The high density polyethylene-asphaltene composite of claim 1, which has a crystallite size of 19 to 25 nm.

13. The high density polyethylene-asphaltene composite of claim 1, which has a corrected degree of crystallinity, $X_{c,cor}$, of 60.2 to 64.0%.

14. The high density polyethylene-asphaltene composite of claim 1, which has at least two of the following properties:
- a tensile strength of 32.5 to 35 MPa,
- a yield strength of 18.5 to 19.0 MPa,
- a max load of 189 to 200 N,
- an elongation at break of 615 to 850%, and
- a modulus of elasticity of 840 to 910 MPa, as determined by ASTM standard D638-02a.

15. The high density polyethylene-asphaltene composite of claim 1, which has a thermal degradation at 50% conversion, $T_{50}$%, of 450 to 470° C., an activation energy for thermal degradation, E, of 350 to 400 kJ/mol, or both, as determined by thermogravimetric analysis.

16. A method of preparing the high density polyethylene-asphaltene composite of claim 1, comprising:
- melting the HDPE polymer to obtain a molten polymer,
- blending the molten polymer with the asphaltene to obtain a blended mixture, and
- hot pressing the blended mixture to obtain the high density polyethylene-asphaltene composite.

17. The method of claim 16, wherein the molten polymer is blended with the asphaltene at a rotor speed of 50 to 100 rpm and at a temperature of 180 to 210° C.

18. The method of claim 16, wherein the blended mixture is hot pressed at a temperature of 180 to 210° C. under a pressure of 5 to 15 MPa.

19. The method of claim 16, wherein the asphaltene is derived from Arabian Heavy crude oil, and the asphaltene comprises 80 to 86 wt. % of carbon atoms, 6.2 to 10.0 wt. % of hydrogen atoms, 15 to 24 ppm of nickel, and 55 to 65 ppm of vanadium, each based on a total weight of the asphaltene.

20. The method of claim 16, wherein the asphaltene is present in an amount ranging from 2 wt. % to 5 wt. % based on the total weight of the high density polyethylene-asphaltene composite.

* * * * *